(12) United States Patent
Yamaguchi et al.

(10) Patent No.: US 10,569,419 B2
(45) Date of Patent: Feb. 25, 2020

(54) CONTROL DEVICE AND ROBOT SYSTEM

(71) Applicant: Seiko Epson Corporation, Tokyo (JP)

(72) Inventors: Yukihiro Yamaguchi, Matsumoto (JP);
Taro Ishige, Matsumoto (JP);
Nobuyuki Setsuda, Okaya (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/117,448

(22) Filed: Aug. 30, 2018

(65) Prior Publication Data

US 2019/0061163 A1 Feb. 28, 2019

(30) Foreign Application Priority Data

Aug. 31, 2017 (JP) ................. 2017-166490

(51) Int. Cl.
*G06F 19/00* (2018.01)
*G05B 19/00* (2006.01)
*B25J 9/16* (2006.01)

(52) U.S. Cl.
CPC .......... *B25J 9/1697* (2013.01); *B25J 9/1664* (2013.01)

(58) Field of Classification Search
CPC combination set(s) only.
See application file for complete search history.

(56) References Cited

FOREIGN PATENT DOCUMENTS

JP 2010-064200 A 3/2010

*Primary Examiner* — Bhavesh V Amin
(74) *Attorney, Agent, or Firm* — Harness, Dickey & Pierce, P.L.C.

(57) ABSTRACT

A control device comprising a processor configured to receive information on a captured image from an imaging device capturing an image from an operator, control a robot including a robot arm on which a stamp that forms a marker on an object and an end effector that performs work on a work target are allowed to be provided by being replaced, perform correlation between a robot coordinate system that is a coordinate system relating to the robot and an image coordinate system that is a coordinate system relating to the captured image, and perform the correlation based on a plurality of coordinates of a predetermined portion of the robot arm in the robot coordinate system and a plurality of coordinates of the plurality of markers in the image coordinate system when the plurality of markers are formed on the object by the stamp.

18 Claims, 16 Drawing Sheets

CONTROL DEVICE AND ROBOT SYSTEM

BACKGROUND

1. Technical Field

The present invention relates to a control device and a robot system.

2. Related Art

In the related art, there is known a robot system that includes a robot including a robot arm for performing work on a work target placed on a work stand and a fixed camera fixed so as to be able to image the work target. In such a robot system, the robot can perform various types of work in the real space based on an image captured by the fixed camera. For that purpose, it is necessary to calibrate (correlate) an image coordinate system of the image captured by the fixed camera and a robot coordinate system as a reference of robot control.

As a calibration method, various methods have been proposed in the related art. The most common method is a method in which processing of touching up a marker disposed on a work stand with a robot to acquire position information in the robot coordinate system and processing of detecting a position of the marker with a fixed camera to acquire position information of the marker in the image coordinate system are performed and calibration between the fixed camera and the robot is performed by combining these two pieces of position information. However, in this method, there is a problem that it is necessary to touch up the marker with the robot, it takes time, and it is difficult to improve accuracy.

Accordingly, as a method for solving this problem, there has been proposed a method of forming a marker at any place by a marking device using a robot including a robot arm that includes the marking device together with a hand for performing work on the work target (See, for example, JP-A-2010-64200). With this, it is possible to omit work of touching up a fixed marker and it is possible to shorten the calibration time.

However, the robot used in such a method includes a hand and a marking device at the tip end portion of the robot arm, the tip end portion is very large, and weight thereof is heavy. For that reason, in such a method, there is a problem that it is difficult to improve accuracy of the calibration. There is a problem that the hand becomes an obstacle at the time of calibration while the marking device becomes an obstacle at the time of work.

SUMMARY

An advantage of some aspects of the invention is to solve at least a part of the problems described above, and the invention can be implemented as the following configurations.

A control device according to an application example includes a reception unit that receives information on a captured image from an imaging unit capable of capturing an image, and a control unit that controls driving of a robot including a robot arm on which a marker forming unit that forms a marker on a marker forming object and a working unit that performs work on a work target are allowed to be provided by being replaced each other, and the control unit is able to execute correlation between a robot coordinate system that is a coordinate system relating to the robot and an image coordinate system that is a coordinate system relating to the captured image, and the control unit performs the correlation based on a plurality of coordinates of a predetermined portion of the robot arm in the robot coordinate system and a plurality of coordinates of the plurality of markers in the image coordinate system when the plurality of markers are formed on the marker forming object by the marker forming unit, in a case where the working unit is not provided on the robot arm.

According to such a control device, it is possible to perform correlation (calibration) using a robot including only a marker forming unit without including a working unit. For that reason, since vibration and the like of the robot arm may be reduced as compared with those in the related art, it is possible to achieve highly accurate calibration.

A control device according to an application example includes a reception unit that receives information on a captured image from an imaging unit capable of capturing an image and a control unit that has a function of performing work on a work target and controls driving of a robot that includes a robot arm on which a marker forming unit that forms a marker together with a marker forming object is provided, and the control unit is able to perform correlation between a robot coordinate system that is a coordinate system relating to the robot and an image coordinate system that is a coordinate system relating to the captured image, and the control unit performs the correlation based on a plurality of coordinates of a predetermined portion of the robot arm in the robot coordinate system and a plurality of coordinates of the plurality of markers in the image coordinate system when the plurality of markers are formed on the marker forming object by the marker forming unit and the marker forming object.

According to such a control device, since vibration and the like of the robot arm may be reduced as compared with those in the related art, it is possible to achieve highly accurate correlation (calibration). Since a robot that includes a marker forming unit having a function as a working unit is used, it is possible to perform calibration and work of the robot on a work target using the calibration result more exactly, quickly and accurately.

In the control device according to the application example, it is preferable that the control unit forms the marker by bringing the marker forming unit into contact with the marker forming object.

With this configuration, it is possible to easily form the marker on the marker forming object.

In the control device according to the application example, it is preferable that the control unit controls driving of the robot so as to form the marker by bringing the marker forming unit configured by a stamp which impresses the marker into contact with the marker forming object.

With this configuration, it is possible to particularly easily form the marker on the marker forming object. It is possible to configure the marker forming unit to be simple and lightweight and it is possible to further reduce the vibration of the robot arm.

In the control device according to the application example, it is preferable that the control unit controls driving of the robot so as to form the marker by bringing the marker forming unit into contact with the marker forming object configured by pressure sensitive paper.

With this configuration, it is possible to easily form the marker on pressure sensitive paper by bringing the marker forming unit into contact with the pressure sensitive paper.

In the control device according to the application example, it is preferable that the reception unit is able to receive an output from a force detection device provided in the robot arm and the control unit detects contact between the marker forming object and the marker forming unit based on the output from the force detection device.

With this configuration, since a contact state at a plurality of places may be made uniform or nearly uniform, it is possible to further improve the accuracy of the calibration.

In the control device according to the application example, it is preferable that the control unit obtains a relative relationship between the robot coordinate system and the image coordinate system based on a plurality of coordinates in the robot coordinate system and a plurality of coordinates of the plurality of markers in the image coordinate system when the plurality of markers are formed and then, performs the correlation based on the relative relationship.

With this configuration, it is possible to further improve accuracy of the calibration. Since a predetermined portion of the robot arm may be automatically moved without a jog operation, for example, it is possible to simplify work by an operator in the calibration.

In the control device according to the application example, it is preferable that the control unit performs the correlation using coordinates in the robot coordinate system of which the number is larger than the number of the coordinates in the robot coordinate system used when obtaining the relative relationship and coordinates in the image coordinate system of which the number is larger than the number of the coordinates in the image coordinate system used when obtaining the relative relationship.

With this configuration, it is possible to further improve accuracy of the calibration as compared with the case where processing for obtaining the relative relationship is not performed.

In the control device according to the application example, it is preferable that the control unit controls driving of the robot so as to form the marker by the marker forming unit provided at a tip end portion of the robot arm.

With this configuration, it is easy to move the marker forming unit to a target portion, and therefore it is possible to perform the calibration more quickly and appropriately.

A robot system according to an application example includes the control device of the application example and a robot controlled by the control device.

According to such a robot system, it is possible to perform calibration and work of the robot on a work target to be performed using the calibration result more exactly, quickly, and accurately.

A control device according to an application example includes a processor that controls driving of a robot including a robot arm on which a marker forming unit that forms a marker on a marker forming object and a working unit that performs work on a work target are allowed to be provided by being replaced each other, and the processor is able to execute correlation between a robot coordinate system that is a coordinate system relating to the robot and an image coordinate system that is a coordinate system relating to the captured image from the imaging unit capable of capturing an image, and the processor performs the correlation based on a plurality of coordinates of a predetermined portion of the robot arm in the robot coordinate system and a plurality of coordinates of the plurality of markers in the image coordinate system when the plurality of markers are formed on the marker forming object by the marker forming unit, in a case where the working unit is not provided on the robot arm.

According to such a control device, since calibration using a robot in a state where the working unit is not provided is possible, vibration and the like of the robot arm may be reduced as compared with those in the related art and accordingly, it is possible to achieve highly accurate calibration.

A control device according to an application example includes a processor that has a function of performing work on a work target and controls driving of a robot that includes a robot arm on which a marker forming unit that forms a marker together with a marker forming object is provided, and the processor is able to perform correlation between a robot coordinate system that is a coordinate system relating to the robot and an image coordinate system that is a coordinate system relating to the captured image from the imaging unit capable of capturing an image, and the processor performs the correlation based on a plurality of coordinates of a predetermined portion of the robot arm in the robot coordinate system and a plurality of coordinates of the plurality of markers in the image coordinate system when the plurality of markers are formed on the marker forming object by the marker forming unit and the marker forming object.

According to such a control device, since vibration and the like of the robot arm may be reduced as compared with those in the related art, it is possible to achieve highly accurate calibration. Since a robot that includes a marker forming unit having a function as a working unit is used, it is possible to perform calibration and work of the robot on a work target using the calibration result more exactly, quickly, and accurately.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a control device and a robot system according to the invention will be described in detail based on preferred embodiments illustrated in the accompanying drawings.

First Embodiment

Figure 1:
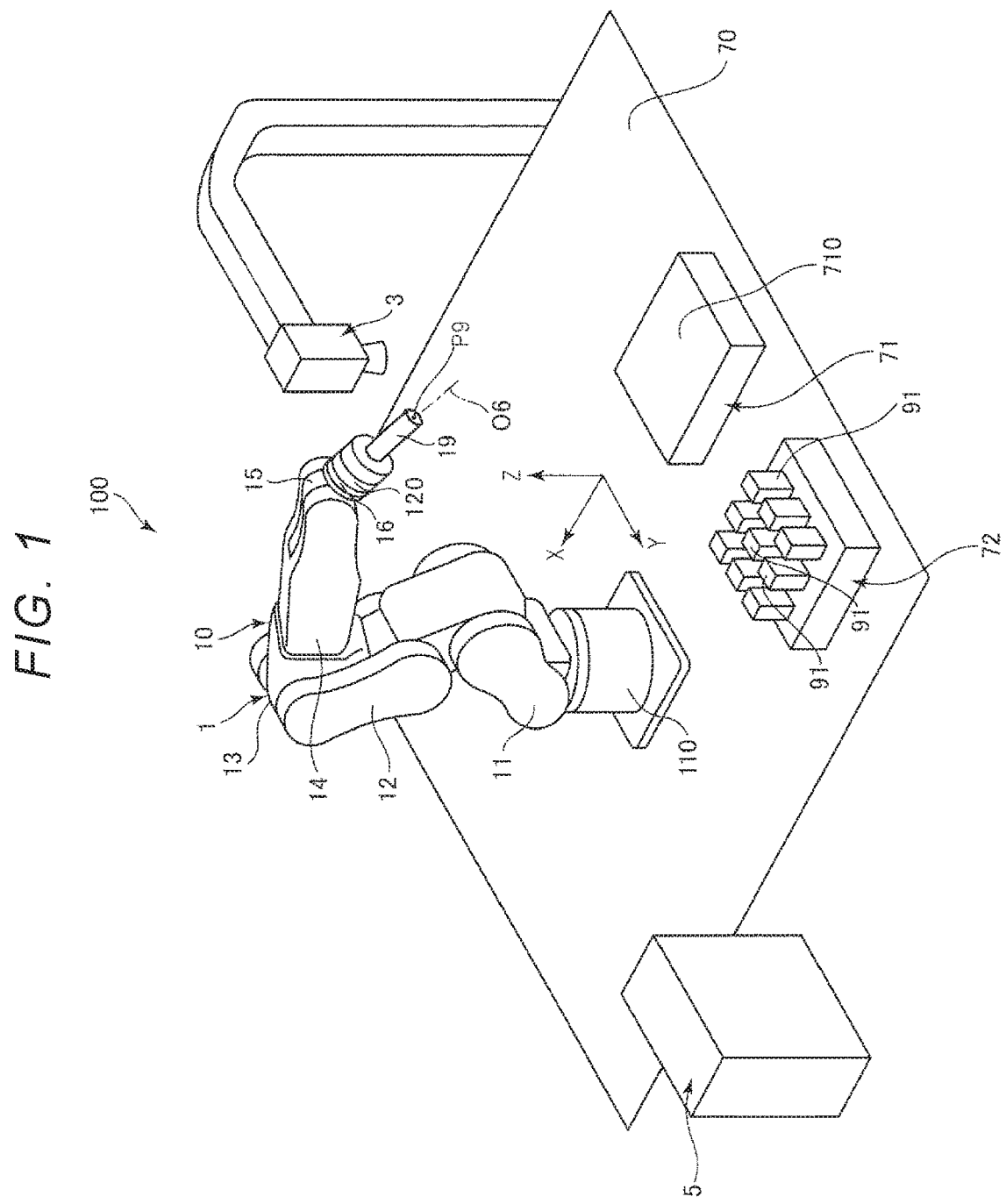
FIG. 1 is a diagram illustrating a robot system according to a first embodiment.
Figure 2:
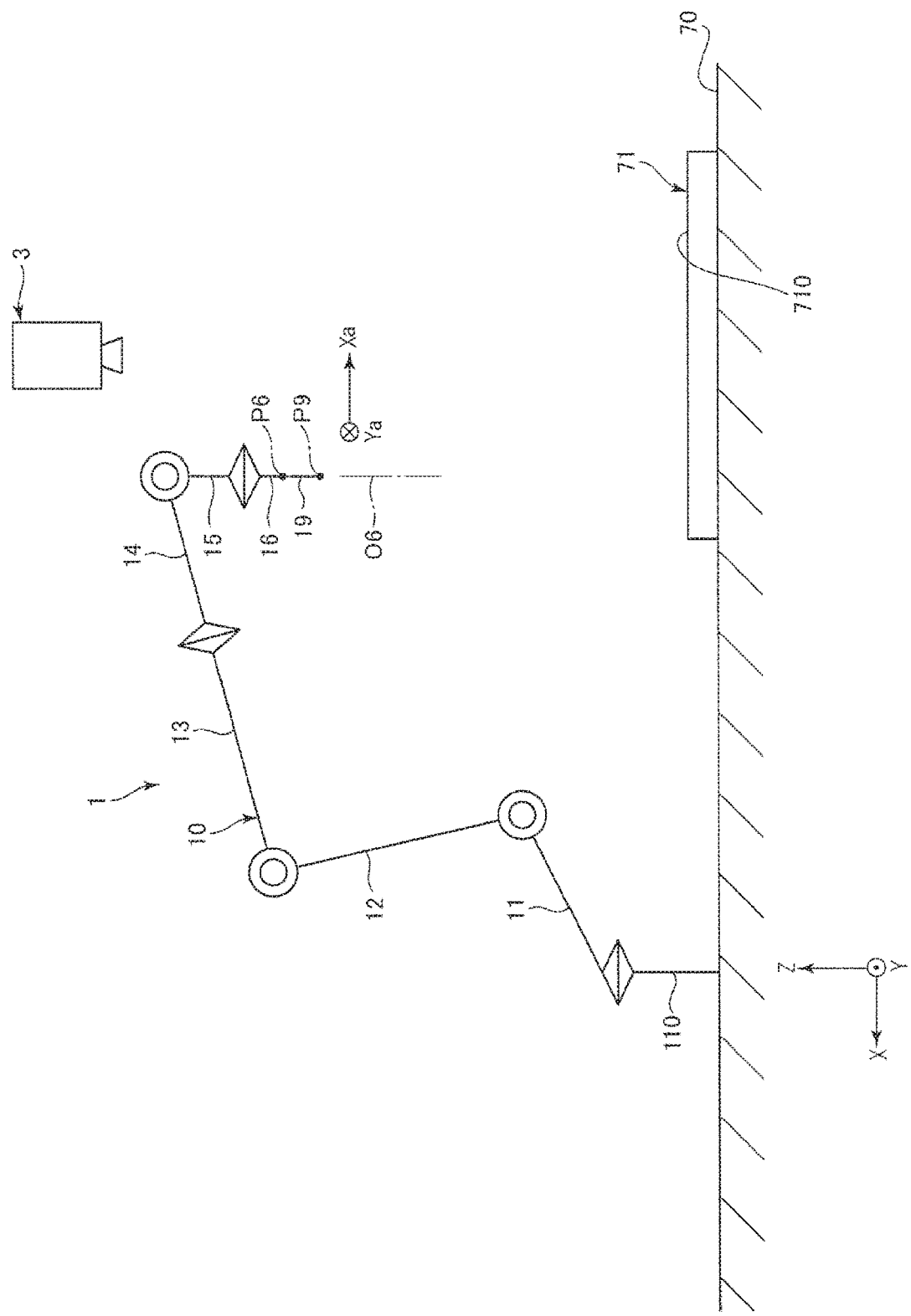
FIG. 2 is a schematic diagram of a robot illustrated in FIG. 1.
Figure 3:
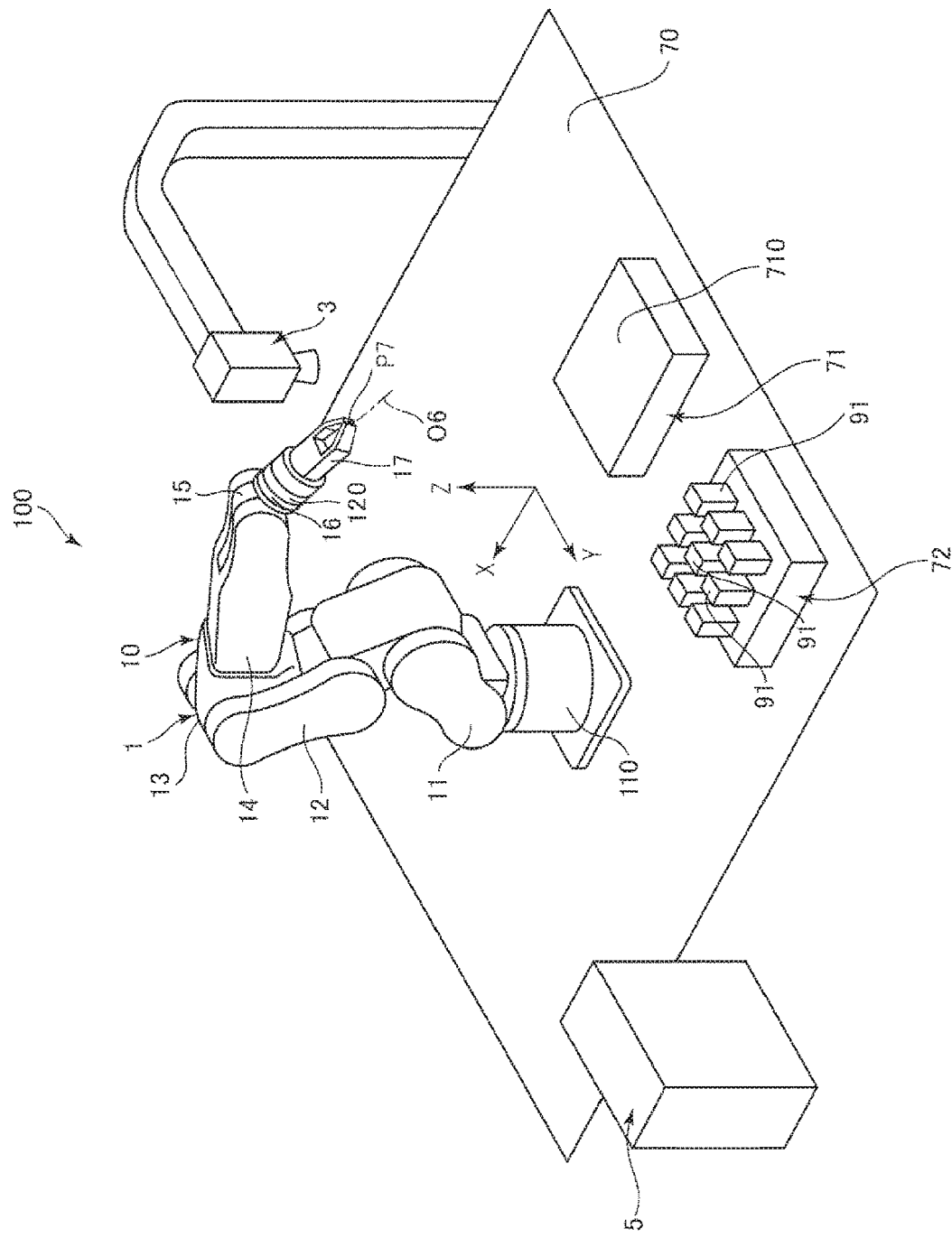
FIG. 3 is a diagram illustrating the robot system that includes a robot including a working unit.
Figure 4:
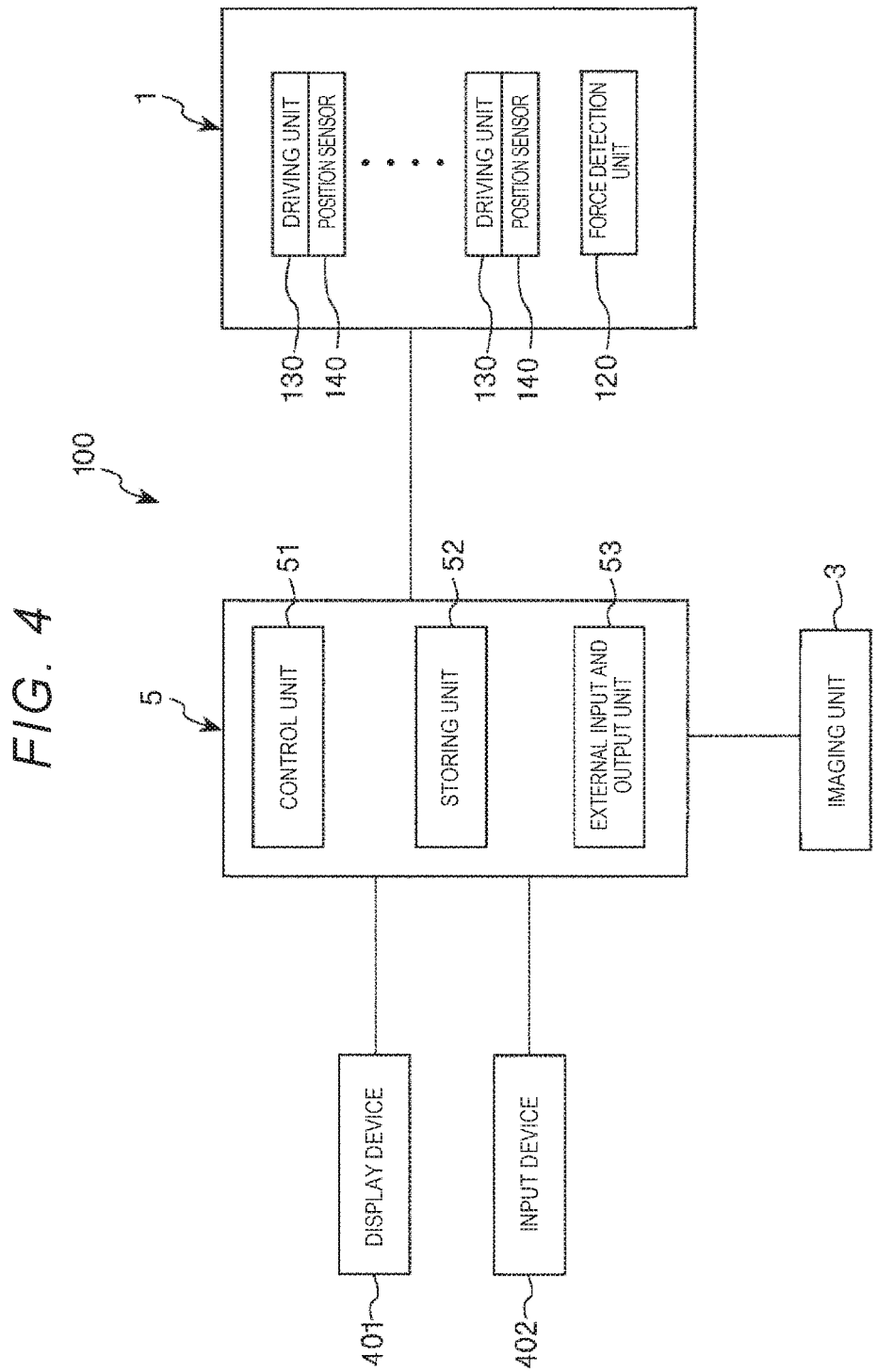
FIG. 4 is a block diagram illustrating the robot system.
Figure 5:
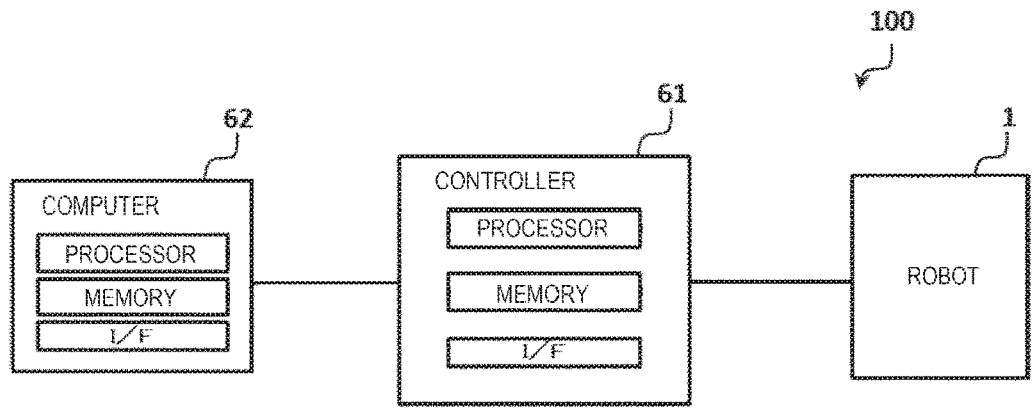
FIG. 5 is a block diagram illustrating a hardware configuration of a control device.

FIG. 1 is a diagram illustrating a robot system according to a first embodiment. FIG. 2 is a schematic diagram of the robot illustrated in FIG. 1. FIG. 3 is a diagram illustrating a robot system that includes a robot including a working unit. FIG. 4 is a block diagram illustrating a robot system. FIG. 5 is a block diagram illustrating a hardware configuration of the control device. In FIG. 1, three axes (X-axis, Y-axis and Z-axis) orthogonal to each other are illustrated. In the following description, a direction parallel to the X-axis is also referred to as an "X-axis direction", a direction parallel to the Y-axis is also referred to as a "Y-axis direction", and a direction parallel to the Z-axis is also referred to as a "Z-axis direction". In the following description, the tip end side of each arrow illustrated in the drawing is referred to as "+ (plus)" and the base end side is referred to as "− (minus)". Also, the Z-axis direction coincides with the "vertical direction" and the direction parallel to the X-Y plane coincides with the "horizontal direction". Also, it is assumed that the + (plus) side of the Z-axis is "upper" and the − (minus) side of the Z-axis is "lower". In FIG. 2, illustration of a force detection unit 120 is omitted. Also, in FIG. 8, FIG. 18, and FIG. 19 to be described later, illustration of the force detection unit 1200 is omitted.

In the present specification, the term "horizontal" includes a case where it is inclined within a range of ±10° or less with respect to the horizontal. Similarly, the term "vertical" includes a case where it is inclined within a range of ±10° or less with respect to the vertical. The term "parallel" includes not only a case where two lines (including axes) or a plane are perfectly parallel to each other but also a case where it is inclined within ±10°. The term "orthogonal" includes not only a case where two lines (including axes) or a plane intersect at an angle of 90° with each other but also a case of being inclined within ±10° with respect to 90°. Further, in the present specification, the term "connection" includes a case of being connected directly and a case of being connected indirectly to any member.

Robot System

A robot system 100 illustrated in FIG. 1 can be used, for example, for holding, transporting, assembling a work target 91 such as an electronic component and the like. The robot system 100 includes a robot 1 and a control device 5 that controls driving of the robot 1. In the robot system 100, an imaging unit 3 having an imaging function, a display device 401 including a monitor, and an input device 402 (operation device) configured by, for example, a mouse, a keyboard, and the like are connected so as to be able to communicate with each other (see FIG. 4).

Robot

As illustrated in FIGS. 1 and 2, the robot 1 is a so-called six-axis vertical articulated robot, and includes a base 110 and a robot arm 10 connected to the base 110.

The base 110 is a portion for attaching the robot 1 to any installation place. In the first embodiment, the base 110 is installed at an installation place 70 such as a floor. The installation place of the base 110 is not limited to the installation place 70 such as a floor, but may be, for example, a wall, a ceiling, on a movable carriage, or the like.

As illustrated in FIGS. 1 and 2, the robot arm 10 includes an arm 11 (first arm), an arm 12 (second arm), an arm 13 (third arm), an arm 14 (fourth arm), an arm 15 (fifth arm), and an arm 16 (sixth arm, tip end arm). These arms 11 to 16 are connected in this order from the proximal end side to the tip end side. Each of the arms 11 to 16 is rotatable with respect to an adjacent arm or the base 110. Here, as illustrated in FIG. 1, the arm 16 has a disk shape and is rotatable around a rotation axis O6 with respect to the arm 15. As illustrated in FIG. 2, in the present embodiment, the center of the tip end surface of the arm 16 is referred to as a predetermined point P6 (predetermined portion).

A stamp 19 (marker forming unit) is detachably attached to the tip end of such a robot arm 10 via a force detection unit 120 to be described later. The stamp 19 is a marker forming unit for forming a marker 190 on a work surface 710 of a work stand 71 (see FIG. 9) and is a component for forming the marker 190 on the work surface 710. The marker 190 is a mark configured by a letter, a mark such as a figure, and the like. In the first embodiment, the stamp 19 is engraved with a circular mark on the tip end surface, a coloring agent such as ink is applied to the tip end surface, and the stamp 19 is pressed against the work surface 710, thereby making it possible to leave a circular imprint on the work surface 710. The work stand 71 (marker forming object) is a stand on which the work target 91 can be placed, and the work stand 71 (particularly, work surface 710) is made of a material capable of forming the marker 190, for example, paper, wood, resin, a metal, or the like.

In the first embodiment, the center of the tip end of the stamp 19 is referred to as a tool center point P9. In the first embodiment, the tool center point P9 and the predetermined point P6 described above are on the rotation axis O6.

Instead of the stamp 19, a hand 17 (working unit) for gripping the work target 91 can be attached to the robot arm 10 (specifically, robot arm 10 including force detection unit 120) (see FIG. 1 and FIG. 3). That is, the robot arm 10 is configured so that the stamp 19 and the hand 17 can be replaced with each other. For example, the robot arm 10 may have a configuration in which a female screw or a male screw used for attaching the stamp 19 or the hand 17 by screwing, bolting, or the like is included, or a configuration in which an engaging portion such as a hook and an L-shaped groove (not illustrated) is included. With this, it is possible to easily attach the stamp 19 or the hand 17 to an appropriate position and to easily replace the stamp 19 and the hand 17 each other. The hand 17 is configured to include, for example, a metal material. In the first embodiment, the center of the tip end of the hand 17 (center between two fingers) is referred to as a tool center point P7. In the first embodiment, the tool center point P7 and the predetermined point P6 described above are on the rotation axis O6.

As illustrated in FIG. 1, between the arm 16 and the stamp 19, a force detection unit 120 (force detection device) is detachably provided to the arm 16 and the stamp 19. The force detection unit 120 detects a force (including moment) applied to the stamp 19. The force detection unit 120 is configured by, for example, a six-axis force sensor, a three-axis force sensor, or the like. The force detection unit 120 outputs detected force detection information to the control device 5.

As illustrated in FIG. 4, the robot 1 includes a driving unit 130 including a motor, a reduction gear, and the like for rotating one arm with respect to the other arm (or base 110). As the motor, for example, a servo motor such as an AC servo motor, a DC servo motor or the like can be used. As the reduction gear, for example, a planetary gear type reduction gear, a wave gear device or the like can be used. The robot 1 includes a position sensor 140 (angle sensor) for detecting a rotation angle of a rotation shaft of the motor or the reduction gear. As the position sensor 140, for example, a rotary encoder or the like can be used. The driving unit 130 and the position sensor 140 are provided, for example, in the respective arms 11 to 16, and in the first embodiment, the robot 1 includes six driving units 130 and six position sensors 140. Each of the driving units 130 is electrically connected to the control device 5 via, for example, a motor driver (not illustrated) built in the robot 1. Each position sensor 140 is also electrically connected to the control device 5.

In such a robot 1, a base coordinate system (robot coordinate system) based on the base 110 of the robot 1 is set. The base coordinate system is a three-dimensional orthogonal coordinate system defined by the X-axis and Y-axis parallel to the horizontal direction and the Z-axis orthogonal to the horizontal direction and having the vertically upward direction as the positive direction. In the first embodiment, the base coordinate system has the center point of the upper end surface of the base 110 as the origin. It is assumed that a translational component with respect to the X-axis is a "component X", the translational component with respect to the Y-axis is a "component Y", and the translational component with respect to the Z-axis is a "component Z". The unit of length (size) of the component X, component Y and component Z is "mm".

Further, in the robot 1, a tip end coordinate system having the predetermined point P6 of the arm 16 as the origin is set. The tip end coordinate system is a two-dimensional orthogonal coordinate system defined by the Xa-axis and Ya-axis orthogonal to each other. Each of the Xa-axis and the-Ya axis is orthogonal to the rotation axis O6. Further, it is assumed that the translational component with respect to the Xa-axis is a "component Xa", and the translational component with respect to the Ya axis is a "component Ya". The unit of the length (size) of the component Xa and the component Ya is "mm". In the first embodiment, calibration of the base coordinate system and the tip end coordinate system has been completed, and the coordinates in the tip end coordinate system can be obtained from calculation from the coordinates in the base coordinate system. In the first embodiment, the base coordinate system is taken as a "robot coordinate system", but the tip end coordinate system may be assumed as the "robot coordinate system".

The configuration of the robot 1 has been briefly as described above. In the first embodiment, as described above, although a case where the "working unit" is the hand 17 has been described as an example, the "working unit" may be anything as long as it performs any work on the work target 91 other than work of forming the marker 190 and may be, for example, a device (not illustrated) provided with an adsorption mechanism, a device for performing screw fastening, or the like. The stamp 19 described above performs work of forming the marker 190 on the work target 91, unlike the "working unit".

Imaging Unit

As illustrated in FIG. 1 and FIG. 2, the imaging unit 3 is positioned vertically above the installation place 70 and is installed so as to make it possible to image the work surface 710 of the work stand 71.

Although not illustrated, the imaging unit 3 includes, for example, an imaging device configured by a charge coupled device (CCD) image sensor having a plurality of pixels, and an optical system including a lens. The imaging unit 3 forms an image of light from an imaging target or the like onto a light receiving surface of an imaging element with a lens, converts light into an electric signal, and outputs the electric signal to the control device 5. The imaging unit 3 is not limited to the configuration described above as long as it has an imaging function, and other configurations may be adopted.

Figure 11:
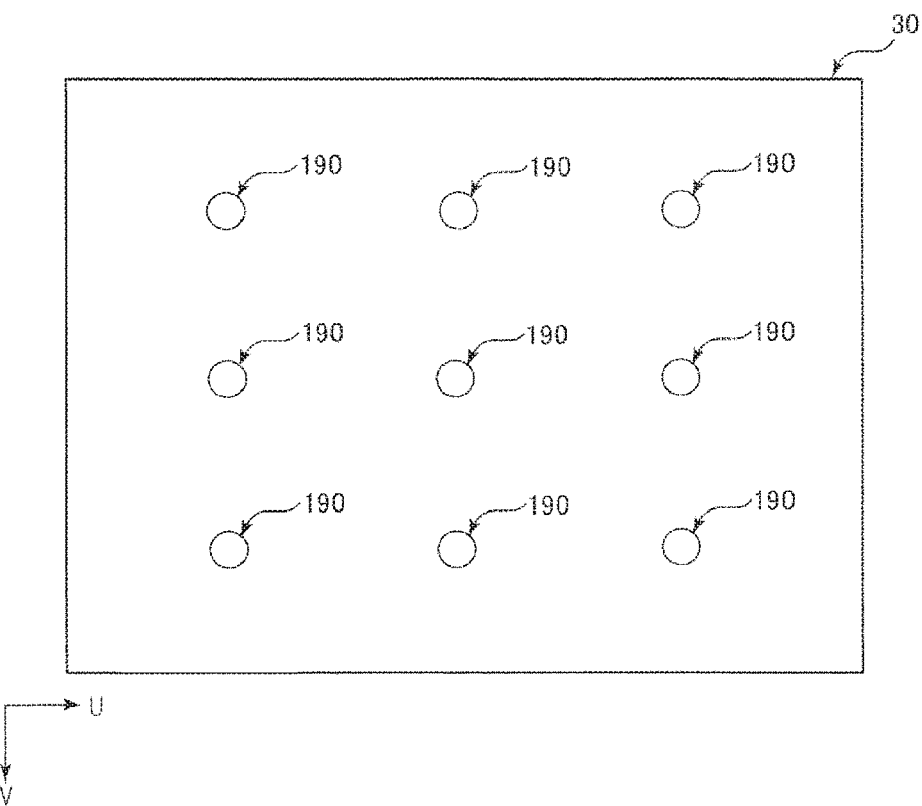
FIG. 11 is a diagram illustrating a captured image in step S14.

In such an imaging unit 3, an image coordinate system, that is, a coordinate system of the captured image 30 output from the imaging unit 3 is set (see FIG. 11). This image coordinate system is a two-dimensional orthogonal coordinate system determined by the U-axis and V-axis respectively parallel to the in-plane direction of the captured image 30. In the first embodiment, it is assumed that the translational component with respect to the U-axis is a "component U" and the translational component with respect to the V axis is a "component V". The unit of the length (magnitude) of the component U and the component V is a "pixel". The image coordinate system is a two-dimensional orthogonal coordinates obtained by nonlinearly converting three-dimensional orthogonal coordinates imaged in the field of view of a camera of the imaging unit 3 by taking into consideration the optical characteristics (focal length, distortion, and the like) of the lens and the number of pixels and size of the image pickup element.

Control Device

As illustrated in FIG. 4, the control device 5 has a function of controlling driving of the robot 1 and is connected to the robot 1 and the imaging unit 3 so as to be able to communicate with each other. The control device 5, the robot 1, and the imaging unit 3 may be connected with each other through wired connection or wireless connection. The control device 5 is connected to a display device 401 including a monitor (not illustrated) and an input device 402 configured by, for example, a keyboard and the like.

As illustrated in FIG. 4, the control device 5 includes a control unit 51 including a processor, a storing unit 52 including a memory and the like, and an external input and output unit 53 including an external interface (I/F). The respective constituent elements of the control device 5 are connected so as to communicate with each other via various buses.

The control unit 51 (processor) includes a processor such as a central processing unit (CPU) and executes various programs and the like stored in the storing unit 52 (memory). With this, it is possible to realize control of driving of the robot 1 and processing such as various operations and determination.

In the storing unit 52, various programs executable by the control unit 51 are stored. In the storing unit 52, various data received by the external input and output unit 53 can be stored. The storing unit 52 is configured to include a volatile memory such as a random access memory (RAM), a non-volatile memory such as a read only memory (ROM), and the like. The storing unit 52 is not limited to a non-detachable type and may be configured to include a detachable external storage device (not illustrated).

Various programs include a robot drive command relating to driving of the robot 1, an image coordinate conversion command relating to correlation between the image coordinate system and the tip end coordinate system of the robot 1 or the robot coordinate system (base coordinate system), a robot coordinate conversion command relating to correlation between the tip end coordinate system and the base coordinate system, and the like.

The image coordinate conversion command is a command for obtaining a coordinate conversion expression for converting image coordinates (U, V: position), which are coordinates in the image coordinate system, into the robot coordinates (X, Y: position) which are the coordinates in the robot coordinate system or the tip coordinates (Xa, Ya: position) which are the coordinates in the tip end coordinate system. This image coordinate conversion command is executed so as to make it possible to perform correlation (calibration) between the image coordinate system and the robot coordinate system and the tip end coordinate system.

As various types of data, for example, data output from a plurality of position sensors 140 included in the robot 1 and data relating to the captured image 30 output from the imaging unit 3 are included. As various types of data, data such as the number of pixels of the imaging unit 3 and data relating to the speed and acceleration (more specifically, moving speed and movement acceleration of the stamp 19, for example) of the robot 1 at the time of execution of calibration, and the like are included.

The control unit 51 executes the program stored in the storing unit 52 so as to make it possible to convert the rotational component (orientation in the image coordinate system) around the normal line of the U-V plane into the rotation component (orientation in the robot coordinate system) around the normal line of the X-Y plane or the rotation component around the normal line of the Xa-Ya plane (orientation in the tip end coordinate system). For example, the value of the rotation angle of the work target 91 (or marker 190) with respect to model (template) of a target contour shape registered in advance is acquired by comparing the work target 91 or the like captured with the captured image 30 with the model. With this, it is possible to obtain the orientation of the work target 91 in the image coordinate system. The orientation of the work target 91 in the robot coordinate system and the orientation of the work target 91 in the tip end coordinate system can be obtained based on correlation between the image coordinate system, the tip end coordinate system and the robot coordinate system.

The external input and output unit 53 includes an external interface (I/F), and is used for each connection of the robot 1, the imaging unit 3, the display device 401, and the input device 402. The external input and output unit 53 functions as a "reception unit" that receives information (data) on the captured image 30 from the imaging unit 3.

Such a control device 5 is configured to include, for example, a controller 61 communicably connected to the robot 1 and a computer 62 communicably connected to the controller 61 as illustrated in FIG. 5. The control device 5 may be configured by the controller 61. Control of driving of the robot 1 may be executed by reading a command (program or data) present in the memory by a processor present in the controller 61, or may be executed via the controller 61 by reading a command in the memory by a processor present in the computer 62.

The control device 5 may have a configuration to which another configuration is added, in addition to the configuration described above. Various programs, data, and the like stored in the storing unit 52 (memory) may be stored in the storing unit 52 in advance, or may be stored in a recording medium (not illustrated) such as a CD-ROM, may be provided from this recording medium, or may be provided via a network or the like.

Display Device and Input Device

The display device 401 illustrated in FIG. 4 includes a monitor and has a function of displaying various screens and the like. Accordingly, the operator can confirm the captured image 30 outputted from the imaging unit 3 and driving of the robot 1 via the display device 401.

The input device 402 is configured by, for example, a keyboard or the like. Accordingly, the operator operates the input device 402 so as to make it possible to issue instructions, such as instructions to execute various processing, to the control device 5. Although not illustrated, the input device 402 may be configured by, for example, a teaching pendant.

Instead of the display device 401 and the input device 402, a display input device (not illustrated) having both functions of the display device 401 and the input device 402 may be used. As the display input device, for example, a touch panel display or the like can be used. The robot system 100 may have one display device 401 and one input device 402, or may have a plurality of display devices 401 and a plurality of plural input devices 402.

The basic configuration of the robot system 100 has been briefly described as above. As described above, the robot system 100 includes the control device 5 and the robot 1 controlled by the control device 5. Then, the control device 5 executes control to be described later.

According to such a robot system 100, since control by the control device 5 to be described later can be executed, it is possible to perform calibration and work on the work target 91 of the robot 1 to be performed using the calibration result more exactly, quickly and accurately.

Control Method

Figure 6:
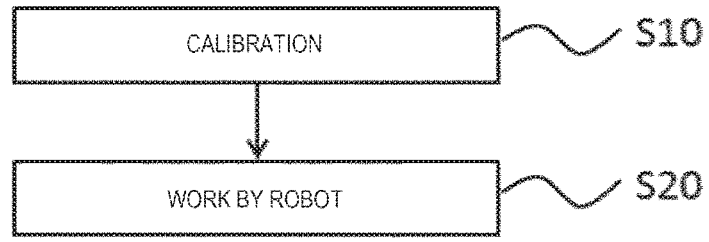
FIG. 6 is a flowchart illustrating a control method of the robot by the control device.

FIG. 6 is a flowchart illustrating a control method of the robot by the control device.

As illustrated in FIG. 6, the control method of the robot 1 by the control device 5 includes a step of calibration (step S10) and a step of work by the robot 1 based on the result of calibration (step S20).

Although the specific work content of the work (step S20) by the robot 1 is not particularly limited as long as it is a work content to be performed on the work target 91 by the hand 17 (working unit), for example, work of gripping the work target 91 placed on the work stand 72 by the hand 17 and transporting and placing the work target 91 on the work stand 71 by the hand 17 (see FIG. 3) is included. Since the specific work content of the work (step S20) by the robot 1 is not particularly limited, description thereof will be omitted below and description will be made on the calibration (step S10) below.

Calibration

Figure 7:
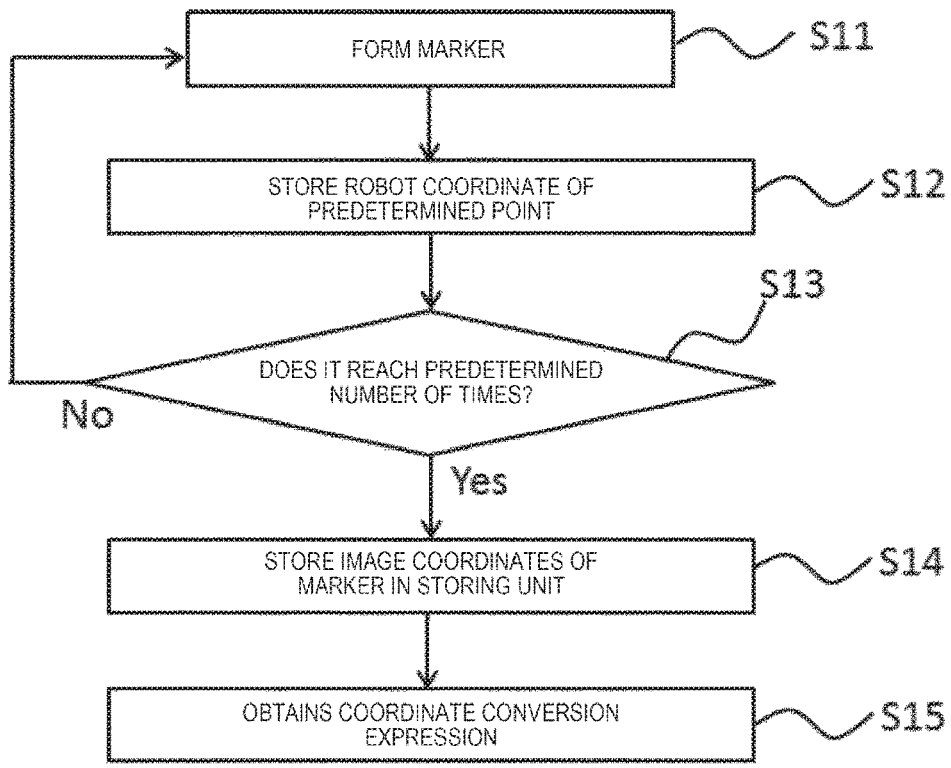
FIG. 7 is a flowchart illustrating a flow of calibration.
Figure 8:
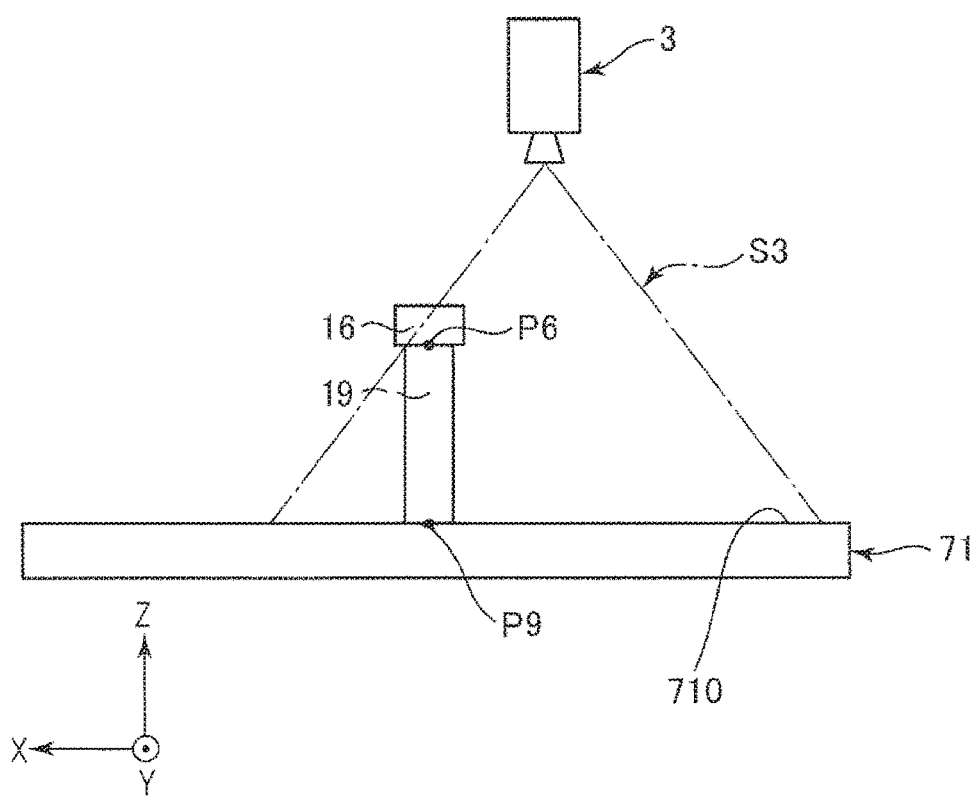
FIG. 8 is a diagram for explaining step S11.
Figure 9:
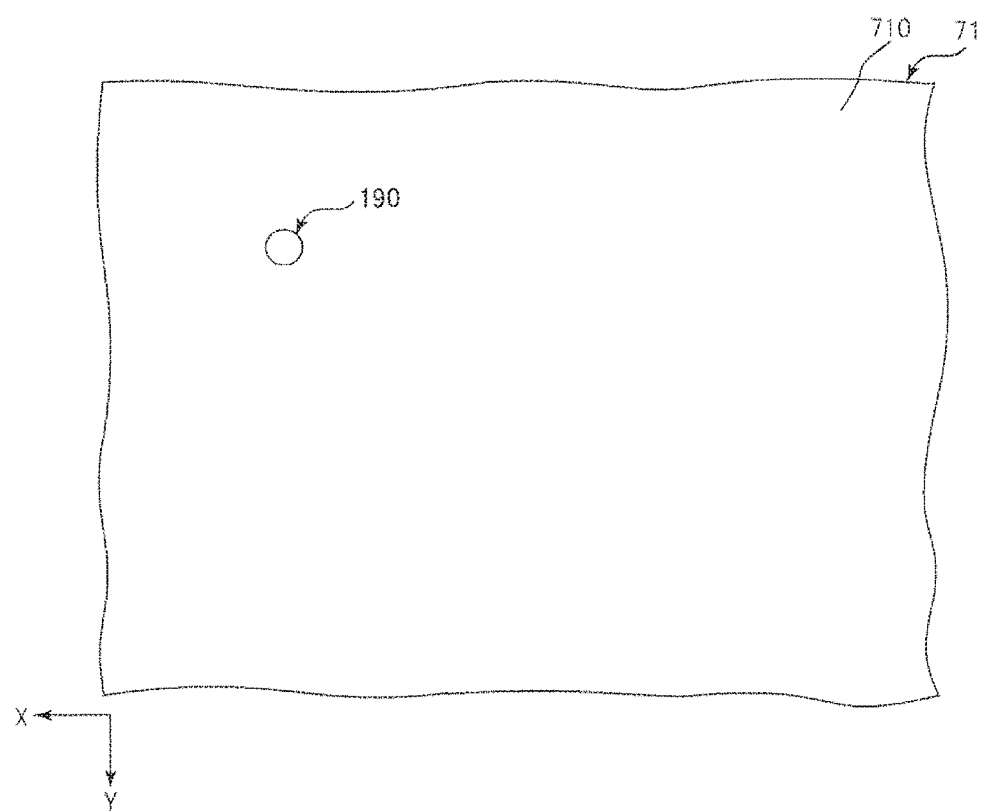
FIG. 9 is another diagram for explaining step S11.
Figure 10:
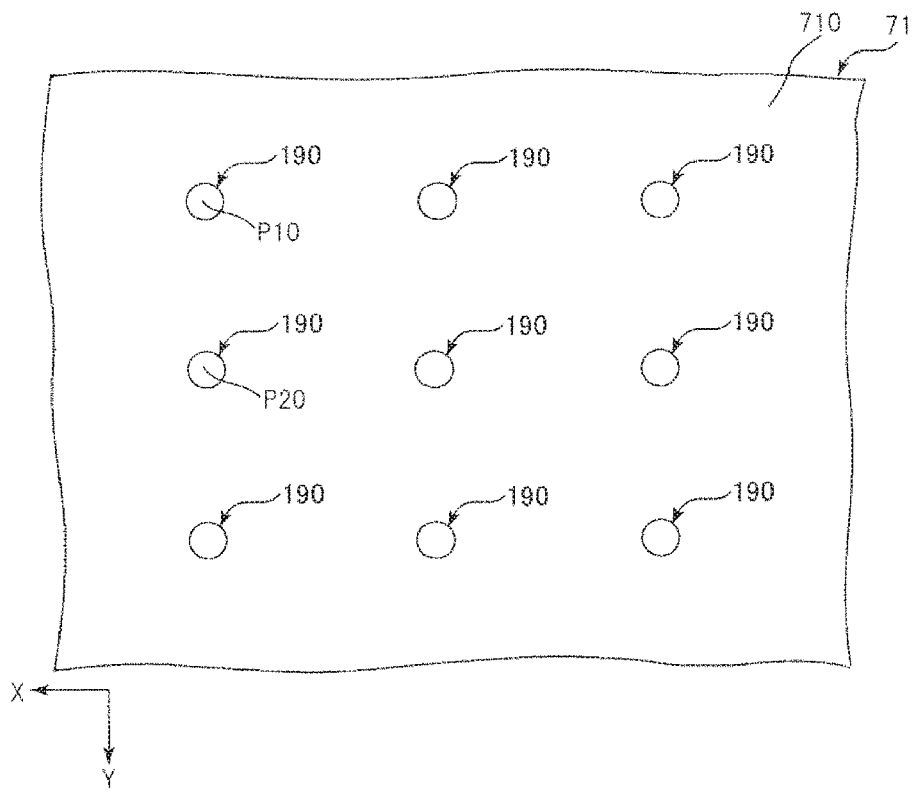
FIG. 10 is a diagram for explaining step S13.

FIG. 7 is a flowchart illustrating a flow of the calibration. FIG. 8 and FIG. 9 are diagrams for explaining step S11, respectively. FIG. 10 is a diagram for explaining step S13. FIG. 11 is a diagram illustrating a captured image in step S14.

In the calibration (step S10), calibration (correlation) between the image coordinate system of the imaging unit 3 and the robot coordinate system of the robot 1 is performed. Specifically, in order to cause the robot 1 to perform various operations based on data of the captured image 30 output from the imaging unit 3, a coordinate conversion expression (coordinate transformation matrix) for converting coordinates (image coordinates) in the image coordinate system into coordinates (robot coordinates) in the robot coordinate system is obtained. That is, obtaining the coordinate conversion expression to make it possible to obtain the robot coordinates from the image coordinates by calculation is equivalent to "correlation" between the image coordinate system and the robot coordinate system.

In the first embodiment, calibration is performed using the stamp 19 illustrated in FIG. 1. The stamp 19 is a component for forming the marker 190 and does not have the function of holding the work target 91. In the first embodiment, the tool center point P9 and the predetermined point P6 are on the rotation axis O6, and setting (tool setting on the X-axis, the Y-axis, and the Z-axis) of the position of the tool center point P9 with respect to the predetermined point P6, that is, the correlation between the predetermined point P6 and the tool center point P9 is completed, and the coordinates of the tool center point P9 with respect to the predetermined point P6 can be obtained from the calculation.

Hereinafter, the calibration will be described with reference to the flowchart illustrated in FIG. 7. This calibration is performed by the control unit 51 executing the program stored in the storing unit 52 in accordance with an instruction made by the operator using the input device 402.

First, the control unit 51 drives the robot arm 10 to position the stamp 19 within the field of view of the imaging unit 3, that is, within an imaging area S3 as illustrated in FIG. 8, and forms the marker 190 on the work surface 710 of the work stand 71 (Step S11). With this, a circular marker 190 is formed on the work surface 710 of the work stand 71 (see FIG. 9). The robot arm 10 for forming the marker 190 is driven by, for example, a jog operation. The jog operation is an operation of the robot 1 based on an instruction of guidance by the operator using the input device 402 such as a teaching pendant.

Next, the control unit 51 stores the robot coordinates of the predetermined point P6 when the marker 190 is formed by the stamp 19 in the storing unit 52 (step S12).

Next, the control unit 51 determines whether or not the number of times in which step S12 described above has been performed reaches a predetermined number of times (step S13), and repeats steps S11 and S12 until the predetermined number of times is reached. In the first embodiment, the predetermined number of times is nine. Accordingly, in the first embodiment, the control unit 51 repeats steps S11 and S12 until it is determined that nine robot coordinates have been acquired.

Here, the control unit 51 moves the stamp 19 so that the marker 190 is positioned within the imaging area S3 of the work surface 710 in step S11 at each time. The control unit 51 moves the stamp 19 so that the markers 190 are formed at different positions at each time. In particular, as illustrated in FIG. 10, the control unit 51 preferably moves the stamp 19 such that the plurality of markers 190 are arranged in a lattice pattern. Accordingly, for example, the control unit 51 forms the marker 190 at the upper left position (first position P10) in FIG. 10 in the first step S11 and forms the marker 190 at the position (second position P 20) at the center on the left side in FIG. 10 in the second step S11. The control unit 51 stores the robot coordinates in the storing unit 52 in each of the first and second rounds. By doing as described above, the control unit 51 repeats steps S11 and S12 nine times and stores the robot coordinates of nine predetermined points P6 in the storing unit 52.

Next, when it reaches a predetermined number of times (nine times in the first embodiment), the control unit 51 causes the imaging unit 3 to collectively capture the nine markers 190 and stores the image coordinates of the respective markers 190 in the storing unit 52 (Step S14). FIG. 11 illustrates the captured image 30 at this time.

Next, based on the robot coordinates of nine predetermined points P6 and the image coordinates of the nine markers 190, the control unit 51 obtains the coordinate conversion expression for converting the image coordinates into the robot coordinates (step S15). With this, the calibration between the image coordinate system and the robot coordinate system, that is, correlation is completed.

Processing of the calibration (step S10) has been briefly described as above. By using the coordinate conversion expression obtained by processing of the calibration (step S10), the position and orientation of the imaging target imaged by the imaging unit 3 can be converted into the position and orientation in the robot coordinate system. Furthermore, as described above, since the robot coordinate system (base coordinate system) and the tip end coordinate system have already been correlated with each other, it is possible to convert the position and orientation of the imaging target imaged by the imaging unit 3 into the position and orientation in the tip coordinate system. For that reason, the control unit 51 can position the stamp 19 at a target place based on the captured image 30. Furthermore, when the stamp 19 is replaced with the hand 17, the control unit 51 can position the hand 17 at the target place based on the captured image 30. Therefore, by using the coordinate conversion expression between the robot coordinate system and the image coordinate system, which is the result in the calibration (step S10), it is possible to cause the robot 1 to work appropriately using the hand 17 in the work by the robot 1 (step S20 in FIG. 6).

In the first embodiment, although the tool center point P7 of the hand 17 is on the rotation axis O6, in a case where the tool center point P7 is not on the rotation axis O6, it is preferable to set (tool setting) the position of the tool center point P7 with respect to the predetermined point P6 after replacing the stamp 19 with the hand 17. With this, it is possible to perform the work by the robot 1 more quickly and accurately based on the result of the calibration.

The control method has been described as above. As described above, the control device 5 includes the external input and output unit 53 (I/F) having a function as a "reception unit" that receives information on the captured image 30 from the imaging unit 3 that can capture images, and the control unit 51 (processor) that controls driving of the robot 1 (which can execute instructions relating to driving) including the robot arm 10 on which the stamp 19 (marker forming unit) that forms the marker 190 on the work stand 71 (marker forming object) and the hand 17 (working unit) that performs work on the work target 91 are allowed to be provided by being replaced each other (see FIGS. 1 to 4 and the like). Further, the control unit 51 can execute correlation (calibration) between the robot coordinate system that is the coordinate system relating to the robot 1 and the image coordinate system that is the coordinate system relating to the captured image 30. When the hand 17 is not provided on the robot arm 10, the control unit 51 performs the correlation based on the plurality of robot coordinates (coordinates) of the predetermined point P6 (predetermined portion) of the robot arm 10 in the robot coordinate system when the plurality of markers 190 are formed on the work stand 71 by the stamp 19 and the plurality of image coordinates (coordinates) of the plurality of markers 190 in the image coordinate system.

According to such a control device 5, since the robot 1 can perform calibration (correlation) using the robot 1 which is in a state where the hand 17 is not attached and in which the stamp 19 is attached, weight of the tip end of the robot arm 10 can be greatly reduced as compared with the case of performing the calibration using the robot 1 which is in a state where both of the hand 17 and the stamp 19 are mounted. For that reason, since the vibration and the like of the robot arm 10 can be reduced as compared with that of the related art, it is possible to achieve highly accurate calibration. Since it is possible to perform the calibration using the marker 190 formed at any place, it is not necessary to perform touch-up processing unlike the related art. For that reason, it is possible to perform the calibration more quickly. Furthermore, since the image coordinates of each marker 190 are obtained based on the captured image 30 obtained by collectively imaging the plurality of markers 190, it is possible to perform the calibration as compared with the case where the captured image 30 is acquired each time the marker 190 is formed. Since it is possible to cause the robot 1 to perform various work to be conducted based on the calibration result (coordinate conversion expression) using the work target 91, it is possible to cause the robot 1 to perform work on the work target 91 accurately. The hand 17 becomes an obstacle at the time of calibration and the marking device does not become an obstacle at the time of work and accordingly, the calibration and work can be performed quickly and accurately.

In the first embodiment, although the predetermined point P6 is set as the predetermined portion, the predetermined portion may be any place of the robot arm 10. For example, the predetermined portion may be the center of the tip end of the arm 15.

As described above, the control unit 51 forms the marker 190 by bringing the stamp 19 (marker forming unit) into contact with the work stand 71 (marker forming object).

With this, the marker 190 can be easily formed on the work stand 71. For example, in a case where the marker forming unit is a device or the like that outputs a laser, a marker can be formed without bringing the marker forming unit into contact with the marker forming object.

In particular, in the first embodiment, as described above, the marker forming unit is configured by the stamp 19. Then, the control unit 51 controls driving of the robot 1 so as to form the marker 190 by bringing the marker forming unit configured by the stamp 19 to which the marker 190 is attached into contact with the work stand 71 (marker forming object).

With this, the marker 190 can be particularly easily formed on the work stand 71. Since the stamp 19 has a simple and lightweight construction, vibration of the robot arm 10 can be further reduced. For that reason, it is possible to further improve accuracy of the calibration by using the stamp 19.

In the first embodiment, the work stand 71 configured to include, for example, paper, wood, resin, metal, or the like, is used as the marker forming object, but the marker forming object may be anything as long as the marker forming unit can form a marker. In the first embodiment, the stamp 19 is used as the marker forming unit, but the marker forming unit may be anything as long as it is capable of forming a marker with respect to the marker forming object. For example, the marker forming object may be a touch panel display including a sensor that detects a touch, and the marker forming unit may be an object (for example, a pen-like object) of which touch can be detected on the touch panel display. For example, the marker forming unit may be a writing instrument such as a pen.

As described above, the force detection unit 120 (force detection device) is provided in the robot arm 10 is with. The external input and output unit 53 having the function as the "reception unit" can receive the output from the force detection unit 120 (force detection device) provided in the robot arm 10, and the control unit 51 detects contact between the work stand 71 (marker forming object) and the stamp 19 (marker forming unit) based on the output from the force detection unit 120.

With this, since a contact state at a plurality of places can be made uniform or nearly uniform, it is possible to further improve the accuracy of the calibration.

As described above, the stamp 19 is provided on the tip end portion of the robot arm 10, that is, the arm 16 positioned at the extreme end. Then, the control unit 51 controls driving of the robot 1 so as to form the marker 190 with the stamp 19 (marker forming unit) provided at the tip end portion of the robot arm 10.

With this, it is easy to move the stamp 19 to the intended place, thereby making it possible to perform the calibration more quickly and appropriately.

The stamp 19 (marker forming unit) may be provided, for example, on the arm 15 or the arm 14. In the first embodiment, the robot 1 is a so-called six-axis vertical articulated robot, but the "robot" controlled by the control device 5 may be a SCALA robot (not illustrated). In the case of using the SCALA robot, though not illustrated, the marker forming unit may be provided on a shaft (operating shaft) provided on the arm included in the SCALA robot, or may be provided on an arm provided with a shaft. As a specific example, although not illustrated, in a case where the SCARA robot includes a base, a first arm (arm) connected to the base, a second arm (arm) connected to the first arm, and a shaft (operating shaft) provided on the second arm, the marker forming unit may be provided on the shaft or may be provided on the second arm.

As described above, the imaging unit 3 is installed so as to be able to image the work surface 710 of the work stand 71. The external input and output unit 53 is capable of communicating with the imaging unit 3 provided so as to be able to image the work stand 71 on which the work target 91 is disposed.

With this, the marker 190 formed on the work stand can be imaged, and the calibration can be accurately performed using the captured image 30. Furthermore, even when work is performed on the work target 91 by the robot 1, the robot 1 can appropriately perform the work using the captured image 30.

In the first embodiment, as illustrated in FIG. 6, although work by the robot 1 (step S20) is performed after the calibration (step S10), if the result of the calibration is used in step S20, Step S20 may be performed alone. The calibration (step S10) may be performed alone.

Second Embodiment

Next, a second embodiment will be described.

Figure 12:
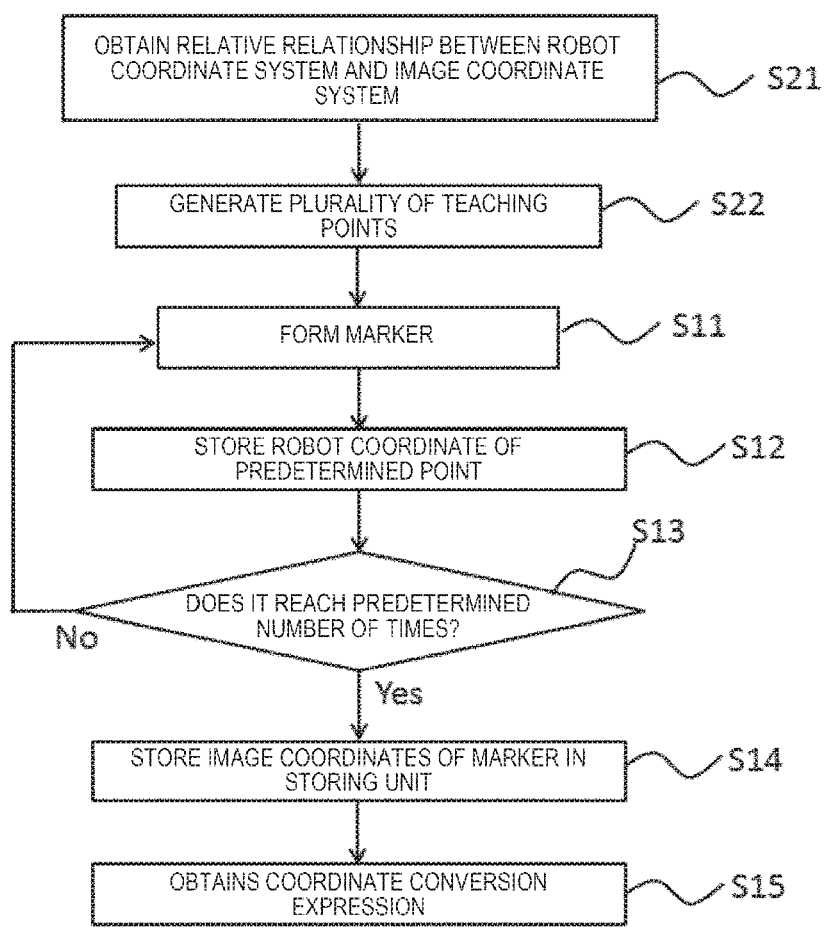
FIG. 12 is a flowchart illustrating the flow of calibration in a second embodiment.
Figure 13:
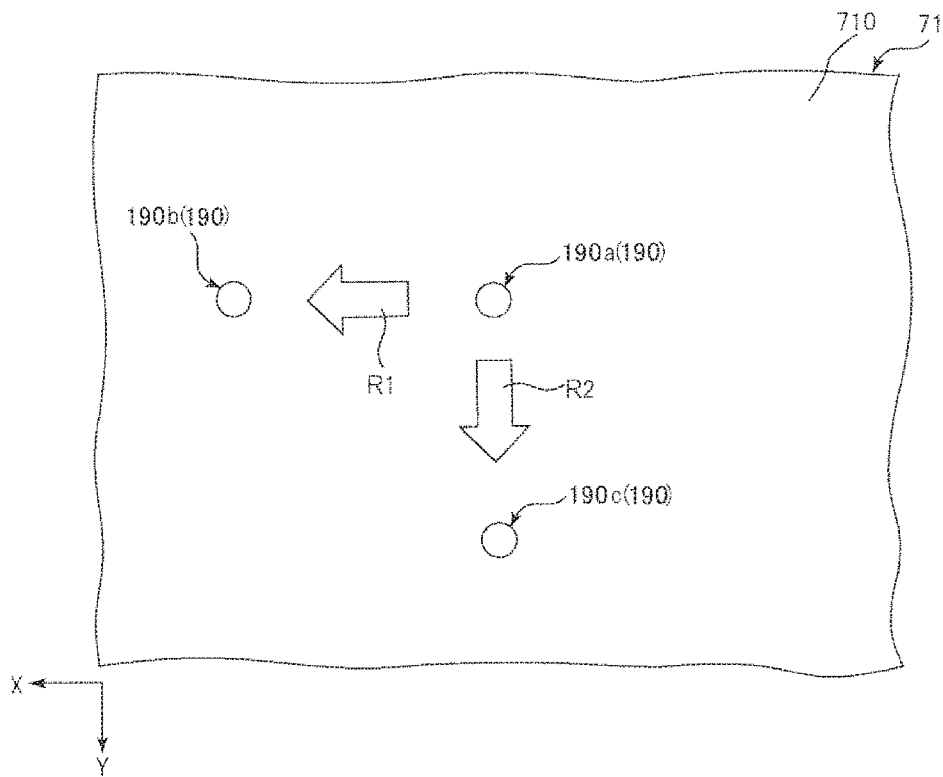
FIG. 13 is a diagram for explaining step S21.
Figure 14:
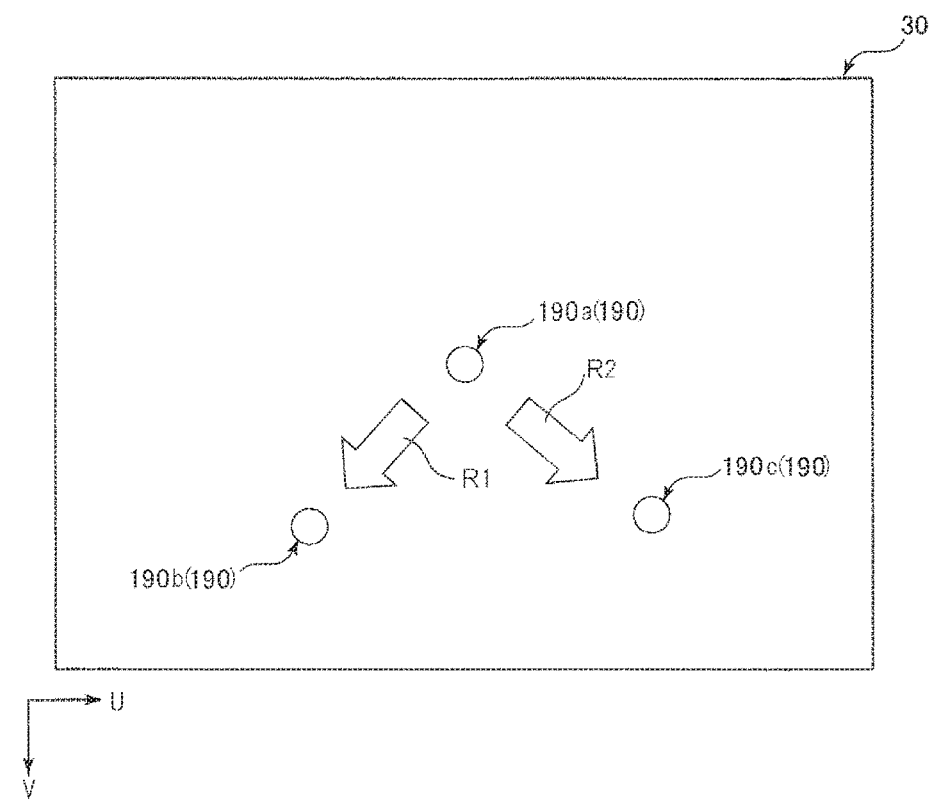
FIG. 14 is another diagram for explaining step S21.
Figure 15:
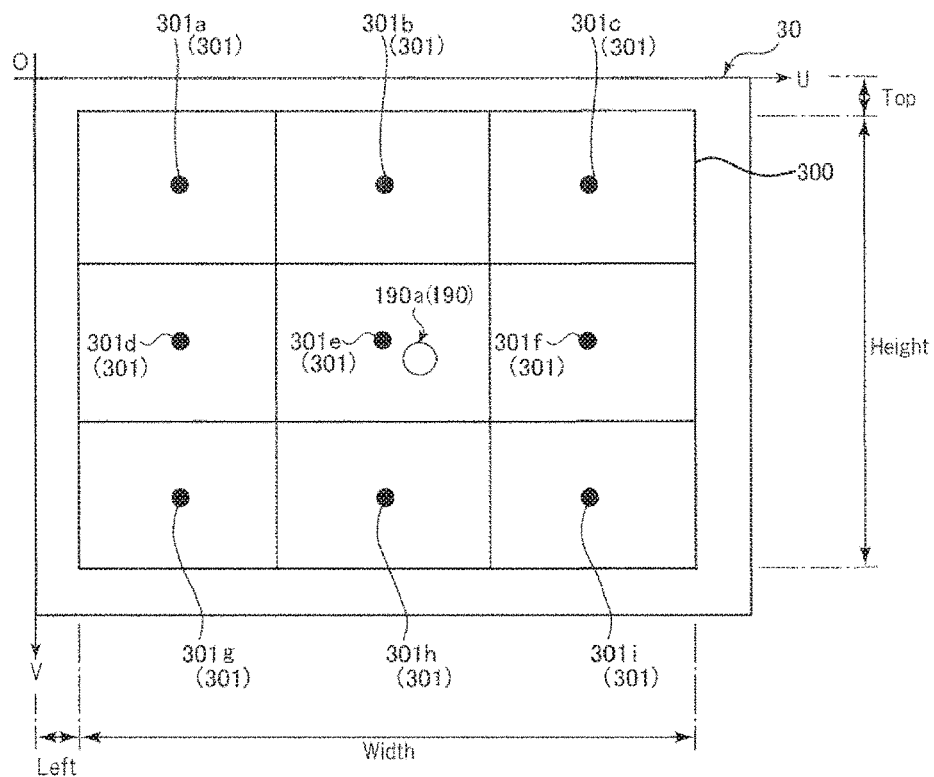
FIG. 15 is a diagram for explaining step S22.
Figure 16:
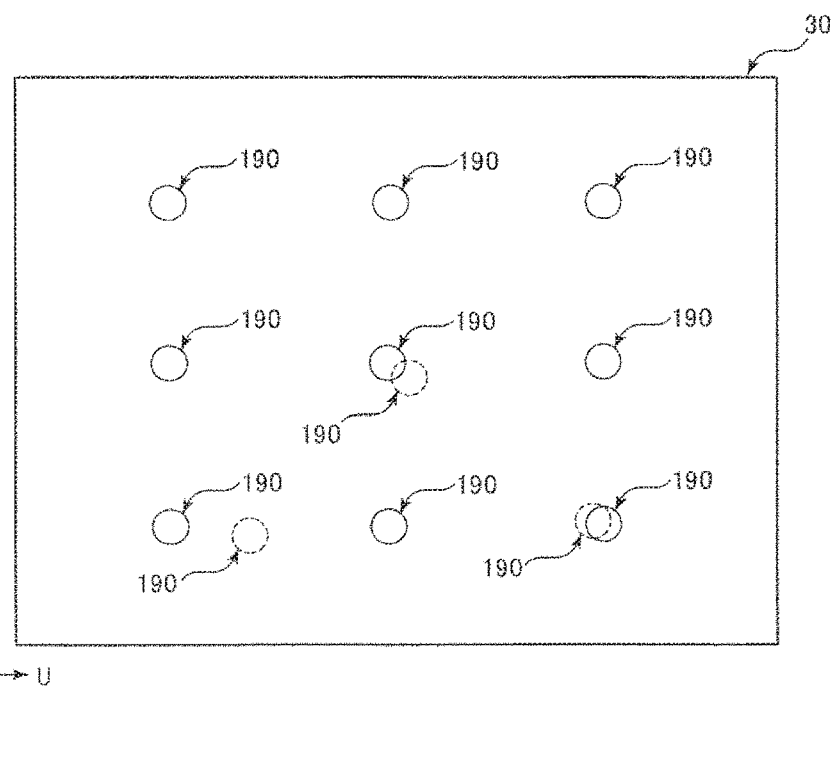
FIG. 16 is a diagram illustrating a captured image in step S13.
Figure 17:
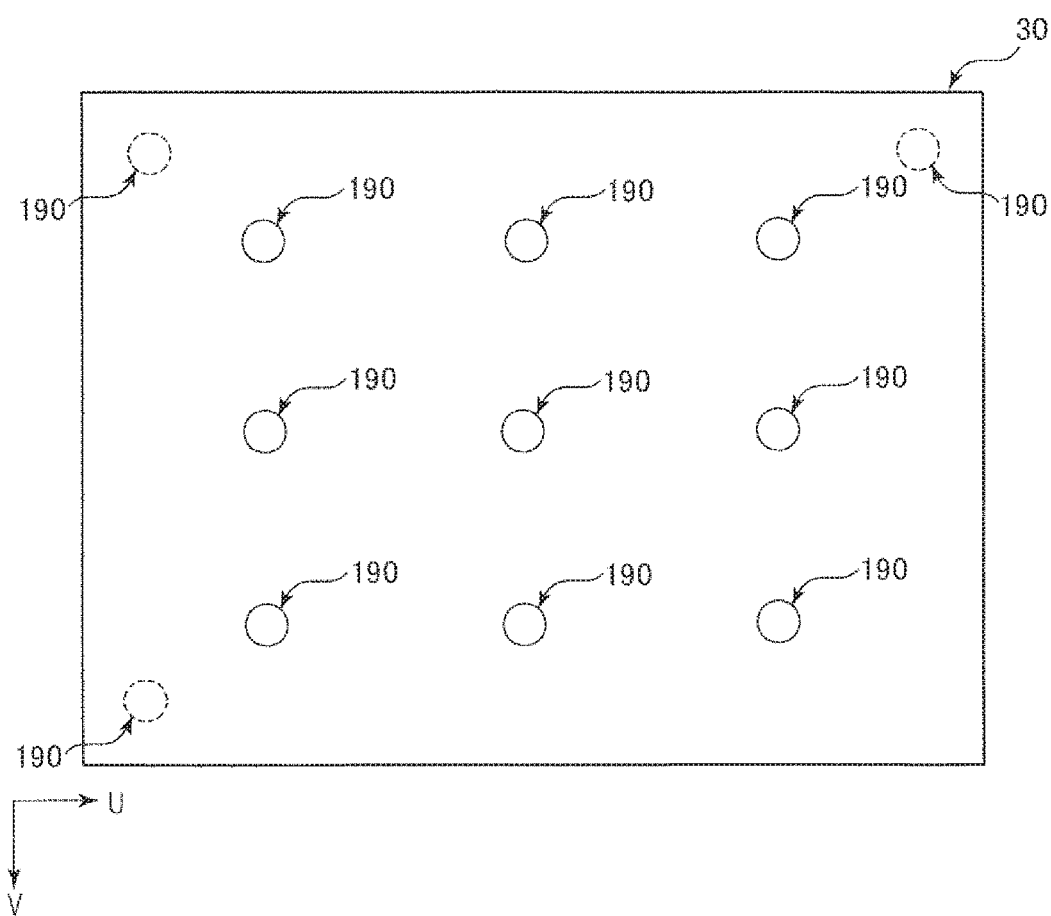
FIG. 17 is a diagram illustrating another example of the captured image in step S13.

FIG. 12 is a flowchart illustrating the flow of calibration in a second embodiment. Each of FIGS. 13 and 14 is a diagram for explaining step S21. FIG. 15 is a diagram for explaining step S22. FIG. 16 is a diagram illustrating a captured image in step S13. FIG. 17 is a diagram illustrating another example of the captured image in step S13.

The second embodiment is the same as the first embodiment described above except that a relative relationship between the robot coordinate system and the image coordinate system is mainly obtained and steps S11 to S16 are automatically performed. In the following description, description will be mainly made on differences from the first embodiment described above, and description of similar matters will be omitted.

Hereinafter, the calibration in the second embodiment will be described with reference to the flowchart illustrated in FIG. 12.

First, prior to performing step S11 described above, the control unit 51 obtains the relative relationship between the robot coordinate system and the image coordinate system (step S21).

Specifically, first, the control unit 51 forms three markers 190 at different positions on the work surface 710 within the field of view of the imaging unit 3 as illustrated in FIG. 13, and then, acquires the captured image 30 as illustrated in FIG. 14 and acquires the robot coordinates and image coordinates in the three markers 190. Next, the control unit 51 obtains coefficients a, b, c, and d in the following equation (1,) based on the acquired three robot coordinates and the acquired three image coordinates acquired. With this, a coordinate conversion expression between the robot coordinates and the image coordinates can be obtained, and it is possible to convert displacement (movement amount) in the image coordinate system into a displacement amount in the robot coordinate system (base coordinate system) or further into displacement (movement amount) in the tip end coordinate system.

$$\begin{pmatrix} \Delta U \\ \Delta V \end{pmatrix} = \begin{pmatrix} a & b \\ c & d \end{pmatrix} \begin{pmatrix} \Delta X \\ \Delta Y \end{pmatrix} \quad (1)$$

ΔX and ΔY in the expression (1) indicate displacement (movement amount) between two places in the image coordinate system, and ΔU and ΔV indicate displacement (movement amount) between two places in the robot coordinate system.

For example, it is assumed that the movement amount of the predetermined point P6 to the point at the time of forming a marker 190b by moving in the direction of an arrow R1 from the point at the time of forming a marker 190a (reference point) is 10 mm in the X-direction and 0 mm in the Y-direction, and the movement amount of the predetermined point P6 to the point at the time of forming a marker 190c by moving in the direction of an arrow R2 from the point at the time of forming the marker 190a is 0 mm in the X-direction and 10 mm in the Y-direction (see FIG. 13). It is assumed that the image coordinates of the marker 190a are (U0, V0), the image coordinates of the marker 190b is (U1, V1), and the image coordinates of the marker 190c is (U2, V2) (see FIG. 14). In this case, the coefficients a, b, c, and d can be obtained as follows.

$\Delta U_1 - U1 - U0 \ \Delta U_1 = 10 \cdot a + 0 \cdot b$ $\Delta V_1 - V1 - V0 \ \Delta V_1 = 10 \cdot c + 0 \cdot d$ $\Rightarrow a = \Delta U_1/10, \ c = \Delta V_1/10$ $\Delta U_2 - U2 - U0 \ \Delta U_2 = 0 \cdot a + 10 \cdot b$ $\Delta V_2 - V2 - V0 \ \Delta U_2 = 0 \cdot c + 10 \cdot d$ $\Rightarrow b = \Delta U_2/10, \ d = \Delta V_2/10$ As such, by using the coordinate conversion expression (affine conversion expression) illustrated in the above expression (1) based on the three robot coordinates and the three image coordinates obtained by moving the predetermined point P6 while forming the marker 190 at three different places, the relative relationship between the robot coordinate system and the image coordinate system can be easily and appropriately obtained. The relative relationship means a relationship in which the movement amount in the image coordinate system can be obtained from the movement amount in the robot coordinate system by calculation.

Next, as illustrated in FIG. 15, nine teaching points 301 in the captured image 30 are set (step S22). In the second embodiment, nine teaching points 301 arranged in a lattice pattern are set. Specifically, as illustrated in FIG. 15, the control unit 51 divides a search window 300 of the captured image 30 into nine parts, and sets the center of each divided region as the teaching point 301.

In step S22, after the nine teaching points 301 are set, the control unit 51 calculates the movement amount (ΔU, ΔV) in the image coordinate system from the marker 190a (reference point) to each teaching point 301 (teaching points 301a to 301i) is obtained.

For example, the control unit 51 can obtain the movement amount (ΔU, ΔV) in the image coordinate system from the marker 190a (reference point) to each teaching point 301 as indicated below. The movement amounts (ΔU, ΔV) in the following image coordinate systems correspond to the teaching points 301a, 301b, 301c, 301d, 301e, 301f, 301g, 301h, and 301i in order from the top. In the following description, the coordinates of the marker 190a (reference point) are indicated by (Xref, Yref), the length in the U-axis direction of the search window 300 is indicated by "Width", the length in the V-axis direction of the search window 300 is indicated by "Height", the distance in the U-axis direction from the origin O to the search window 300 is indicated by "Left", and the distance in the V-axis direction from the origin O to the search window 300 is indicated by "Top".

$$\left(\left(\text{Left} + \frac{\text{Width}}{6}\right) - Xref, \left(\text{Top} + \frac{\text{Height}}{6}\right) - Yref\right)$$

$$\left(\left(\text{Left} + \frac{\text{Width}}{2}\right) - Xref, \left(\text{Top} + \frac{\text{Height}}{6}\right) - Yref\right)$$

$$\left(\left(\text{Left} + \frac{5 \cdot \text{Width}}{6}\right) - Xref, \left(\text{Top} + \frac{\text{Height}}{6}\right) - Yref\right)$$

$$\left(\left(\text{Left} + \frac{5 \cdot \text{Width}}{6}\right) - Xref, \left(\text{Top} + \frac{\text{Height}}{2}\right) - Yref\right)$$

$$\left(\left(\text{Left} + \frac{\text{Width}}{2}\right) - Xref, \left(\text{Top} + \frac{\text{Height}}{2}\right) - Yref\right)$$

$$\left(\left(\text{Left} + \frac{\text{Width}}{6}\right) - Xref, \left(\text{Top} + \frac{\text{Height}}{2}\right) - Yref\right)$$

$$\left(\left(\text{Left} + \frac{\text{Width}}{6}\right) - Xref, \left(\text{Top} + \frac{5 \cdot \text{Height}}{6}\right) - Yref\right)$$

$$\left(\left(\text{Left} + \frac{\text{Width}}{2}\right) - Xref, \left(\text{Top} + \frac{5 \cdot \text{Height}}{6}\right) - Yref\right)$$

$$\left(\left(\text{Left} + \frac{5 \cdot \text{Width}}{6}\right) - Xref, \left(\text{Top} + \frac{5 \cdot \text{Height}}{6}\right) - Yref\right)$$

In step S22, based on the coordinate conversion expression obtained in step S21 and the movement amount (ΔU, ΔV) in the image coordinate system, the control unit 51 obtains the relative movement amount (ΔX, ΔY) of the predetermined point P6 in the robot coordinate system. With this, it is possible to automatically perform steps S11 to S15 regardless of the jog operation. In FIG. 16, the captured image 30 obtained by imaging the nine markers 190 in step S14 is illustrated. In FIG. 16, three markers 190 formed in step S21 are indicated by broken lines, and the nine markers 190 formed in step S11 are indicated by solid lines.

Here, although the control unit 51 forms nine markers 190 (step S11) as indicated by the solid lines in FIG. 16 after the three markers 190 are formed as indicated by broken lines in FIG. 16 (step S21), for example, the control unit 51 may form each marker 190 as illustrated in FIG. 17. Specifically, the control unit 51 may form the nine markers 190 as indicated by the solid lines in FIG. 17 (Step S11) after forming the three markers 190 as indicated by the broken line in FIG. 17 (step S21). That is, in step S11, the control unit 51 forms nine markers 190 at different positions (not overlapping) from positions of the three markers 190 formed in step S21. With this, the markers 190 do not overlap each other and thus, visibility of the operator can be enhanced.

The control unit 51 may make colors and shapes of the marker 190 to be formed in step S21 different from those of the marker 190 to be formed in step S11. Even with such a method, visibility of the operator can be enhanced.

The calibration in the second embodiment has been described as above. As described above, after obtaining a relative relationship between the robot coordinate system and the image coordinate system based on a plurality of robot coordinates (coordinates) in the robot coordinate system and a plurality of image coordinates (coordinates) of the plurality of markers 190 in the image coordinate system when the plurality of markers 190 are formed, the control unit 51 performs the correlation based on the relative relationship.

With this, it is possible to further improve accuracy of the calibration. As described above, since the movement amount in the image coordinate system can be obtained from the movement amount in the robot coordinate system by obtaining the relative relationship, in step S11, nine teaching points 301 (plurality of places), it is possible to automatically move the predetermined point P6 to the nine teaching points 301 (a plurality of points) regardless of the jog operation in step S11. For that reason, it is possible to easily perform work of the operator in the calibration.

Furthermore, the control unit 51 performs the correlation using the robot coordinates (coordinates) in the robot coordinate system of which the number is larger than the number of robot coordinates (coordinates) in the robot coordinate system used when obtaining the relative relationship and the image coordinates (coordinates) in the image coordinate system of which the number is larger than the number of image coordinates (coordinates) in the image coordinate system used when obtaining the relative relationship. In the second embodiment, three robot coordinates and three image coordinates are used in step S21, and nine robot coordinates and nine image coordinates are used when obtaining the coordinate conversion expression in step S15.

With this, since the marker 190 can be formed at substantially even intervals at nine places (teaching points 301) as compared with the case where processing for obtaining the relative relationship is not performed, it is possible to further improve accuracy of the calibration.

In the second embodiment, although nine teaching points 301 are present, the number of teaching points 301 is arbitrary and may be at least three. However, as the number of the teaching points 301 is increased, accuracy of the calibration is improved. It is preferable that the number of teaching points 301 is equal to or more than the number of robot coordinates (three in the second embodiment) used when obtaining the coordinate conversion expression in step S21. In the second embodiment, although the teaching points 301 are arranged in a lattice pattern, the arrangement of teaching points 301 are not limited to the lattice pattern shapes.

In the second embodiment, similarly to the first embodiment described above, the case where the tool center point P9 and the predetermined point P6 are on the rotation axis O6 and the robot coordinates (X, Y) of the tool center point P9 coincides with the robot coordinates (X, Y) of the predetermined point P6 is described by way of an example. That is, the case where setting (tool setting of the X-axis, the Y-axis, and the Z-axis) of the position of the tool center point P9 with respect to the predetermined point P6, that is, the correlation between the predetermined point P6 and the tool center point P9 is in a state in which the position and orientation (coordinates) of the tool center point P9 with respect to the predetermined point P6 can be obtained from the calculation was described by way of an example. In contrast, in a case where the robot coordinates (X, Y) of the tool center point P9 and the robot coordinates (X, Y) of the predetermined point P6 do not coincide with each other, it is preferable to set the position of the tool center point P9 with respect to the predetermined point P6 (X coordinate and Y coordinate tool setting) after step S22 before step S11. With this, it is possible to improve accuracy of calibration even when the tool center point P9 and the predetermined point P6 do not coincide with each other.

Although the method of setting the tool is not particularly limited, for example, a method of moving the predetermined point P6 to two different positions while positioning the marker 190 (tool center point P9) at the center of the image of the captured image 30 is included. In this method, the position of the tool center point P9 with respect to the predetermined point P6 is obtained based on the robot coordinates and image coordinates of the predetermined point P6 before and after the movement, a rotation angle θ of the predetermined point P6 around the tool center point P9, and the coordinates of the marker 190 in the image coordinate system. According to such a method, it is possible to set the tool easily and accurately. In a case where the position of the tool center point P9 with respect to the predetermined point P6 is obtained from a design value or an actual measurement value, the design value or the actual measurement value may be used as the position of the tool center point P9 with respect to the predetermined point P6.

Also, in the second embodiment as described above, the same effect as in the first embodiment can be achieved.

Third Embodiment

Next, a third embodiment will be described.

Figure 18:
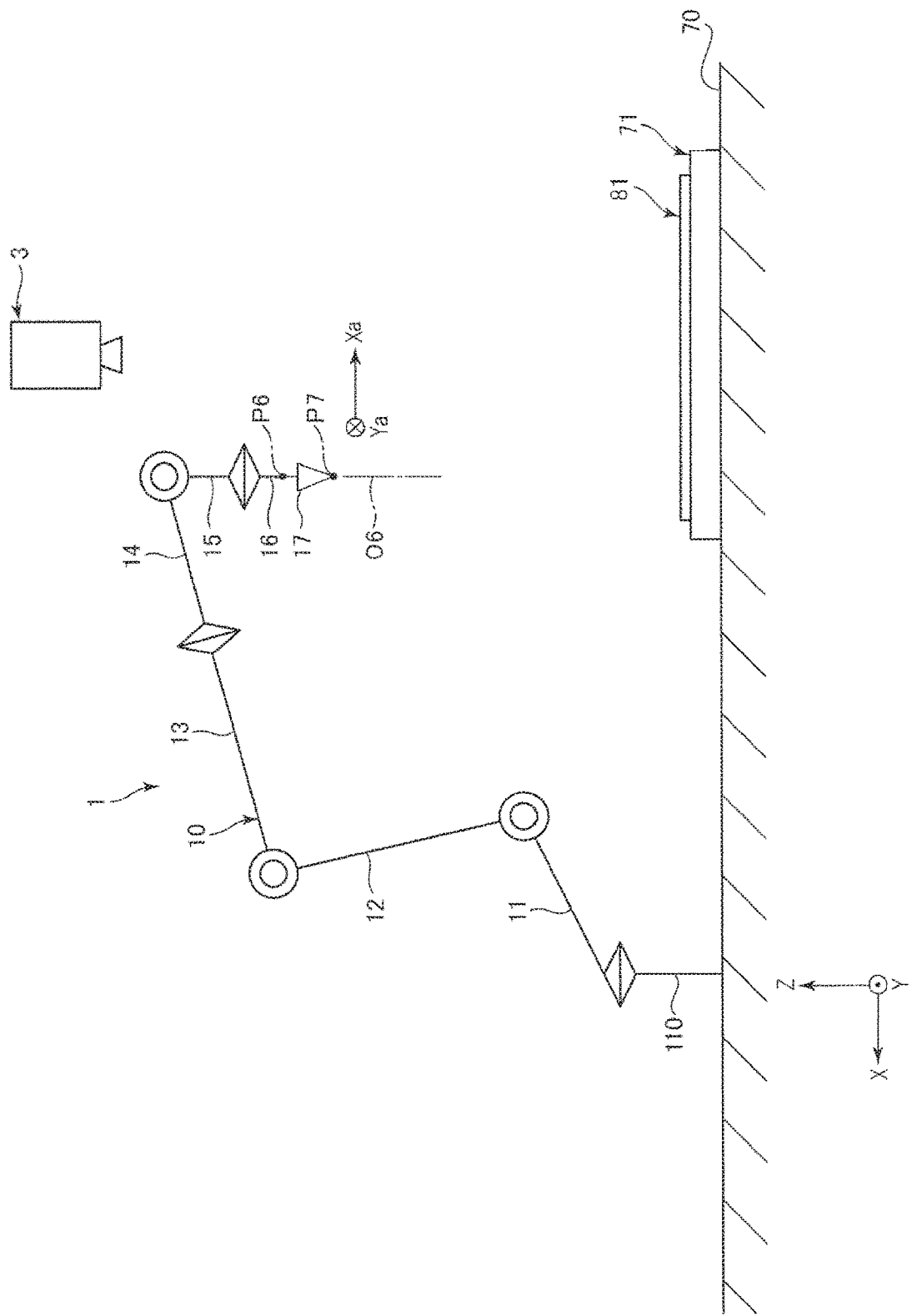
FIG. 18 is a diagram illustrating a robot system according to a third embodiment.
Figure 19:
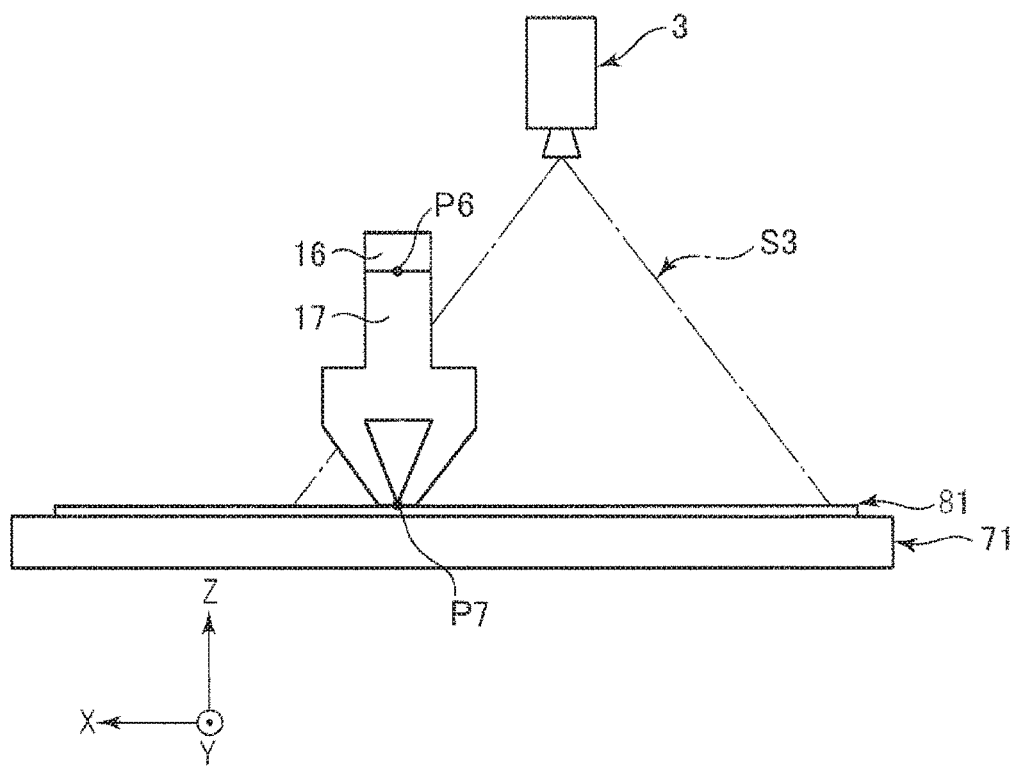
FIG. 19 is a diagram for explaining step S11.
Figure 20:
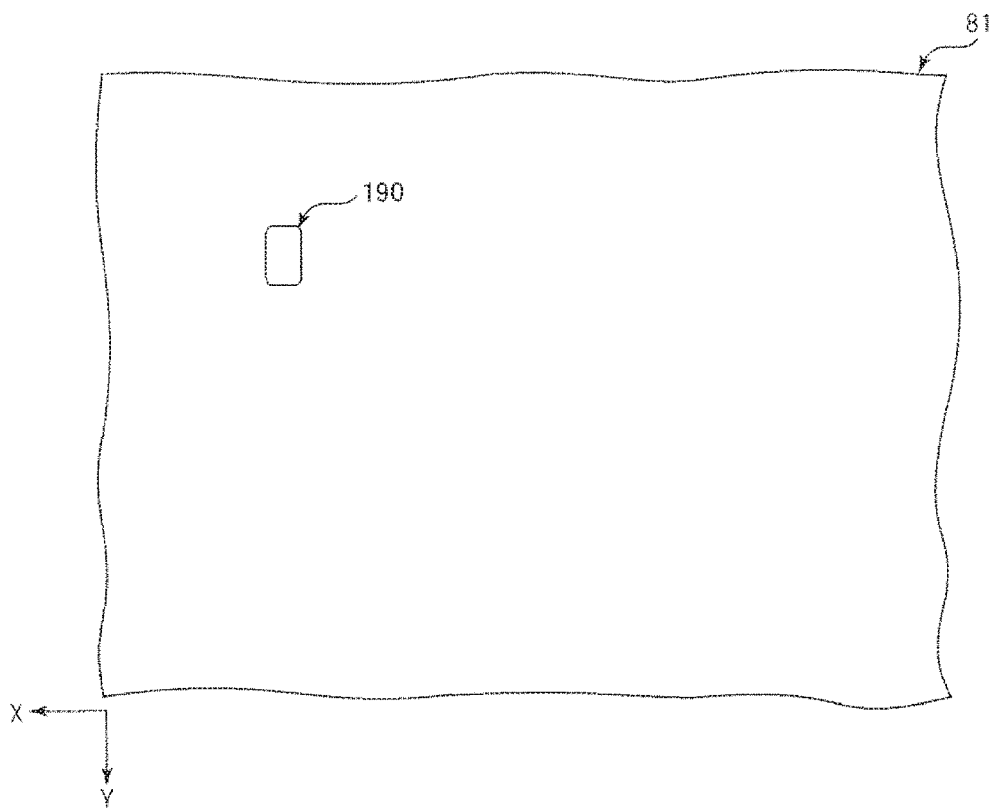
FIG. 20 is a diagram for explaining step S11.
Figure 21:
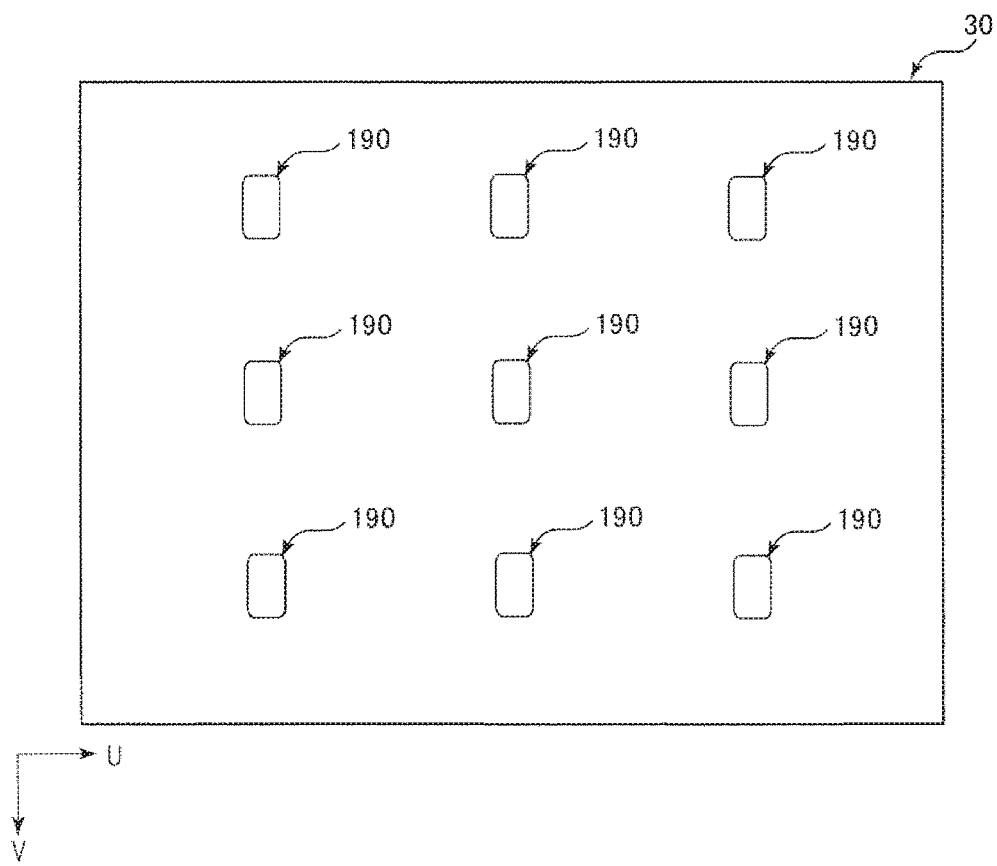
FIG. 21 is a diagram illustrating a captured image in step S14.

FIG. 18 is a diagram illustrating a robot system according to a third embodiment. FIG. 19 and FIG. 20 are diagrams for explaining step S11. FIG. 21 is a diagram illustrating a captured image in step S14.

The third embodiment is similar to the calibration in the first embodiment except that the calibration using the robot 1 in a state where the hand 17 (working unit) is worn is mainly performed. In the following description, differences from the first embodiment described above will be mainly described, and description of similar matters will be omitted.

As illustrated in FIG. 18, in the calibration of the third embodiment, the hand 17 for forming the marker 190 together with pressure sensitive paper 81 (marker forming object) pressure sensitive paper 81 (marker forming object) is used. A specific configuration of the pressure sensitive paper 81 is not particularly limited, and general pressure sensitive paper can be used. The calibration in the third embodiment is the same as that in the flow illustrated in FIG. 7 except that the hand 17 and the pressure sensitive paper 81 are used.

Specifically, first, in step S11, the control unit 51 positions the hand 17 in the imaging area S3 as illustrated in FIG. 19 and presses the pressure sensitive paper 81 with the hand 17 toward the work stand 71 side. With this, as illustrated in FIG. 20, the marker 190 is formed on the pressure sensitive paper 81 (step S11).

When it reaches the predetermined number of times (nine times in the third embodiment) in step S14, the control unit 51 causes the imaging unit 3 to collectively image the nine markers 190, and stores the image coordinates of the respective markers 190 in the storing unit 52 (Step S14). The captured image 30 at this time is illustrated in FIG. 21.

As described above, in the third embodiment, the control device 5 includes the external input and output unit 53 (I/F) having a function as the "reception unit" that receives information (data) on the captured image 30 from the imaging unit 3 that can capture images and the control unit 51 (processor) that controls driving of the robot 1 (which can execute instructions relating to driving) including the robot arm 10 having a function of performing work on the work target 91 and provided with the hand 17 (marker forming unit) for forming the marker 190 together with the pressure sensitive paper 81 (marker forming object). Further, the control unit 51 can execute correlation (calibration) between the robot coordinate system that is the coordinate system relating to the robot 1 and the image coordinate system that is the coordinate system relating to the captured image 30. The control unit 51 performs the correlation based on the plurality of robot coordinates (coordinates) of the predetermined point P6 (predetermined portion) of the robot arm 10 in the robot coordinate system when a plurality of markers 190 are formed on the pressure sensitive paper 81 by the hand 17 and the pressure sensitive paper 81 the plurality of image coordinates (coordinates) of the plurality of markers 190 in the image coordinate system.

According to such a control device 5, since it is possible to perform calibration using the robot 1 including the hand 17 and the pressure sensitive paper 81, vibration of the robot arm 10 and the like can be reduced as compared with that in the related art. For that reason, it is possible to improve accuracy of the calibration. Since the replacement of the stamp 19 and the hand 17 with each other is unnecessary, the calibration can be performed more quickly.

In particular, in the third embodiment, as described above, the marker forming object is configured by the pressure sensitive paper 81. Then, the control unit 51 controls driving of the robot 1 so as to form the marker 190 by bringing the hand 17 (marker forming unit) into contact with the marker forming object configured by the pressure sensitive paper 81.

With this, it is possible to easily form the marker 190 on the pressure sensitive paper 81 by bringing the hand 17 into contact with the pressure sensitive paper 81.

In the third embodiment, although the pressure sensitive paper 81 is used as the marker forming object, the marker forming object may be anything as long as it can form a marker together with the marker forming unit. For example, the marker forming object may be an object containing magnet powder. In this case, the marker forming unit may be a working unit or the like configured to contain a magnetic object, for example, a metal material. The marker forming object may be a sheet or the like configured to change its color according to applied pressure.

The "marker forming object" in the first embodiment described above may be not the work stand 71 but the work stand 71 provided with the pressure sensitive paper 81. That is, the marker 190 may be formed on the pressure sensitive paper 81 by the stamp 19.

Also, in the third embodiment described above, the same effect as in the first embodiment can be exhibited.

Another Configuration Example of Robot System

Figure 22:
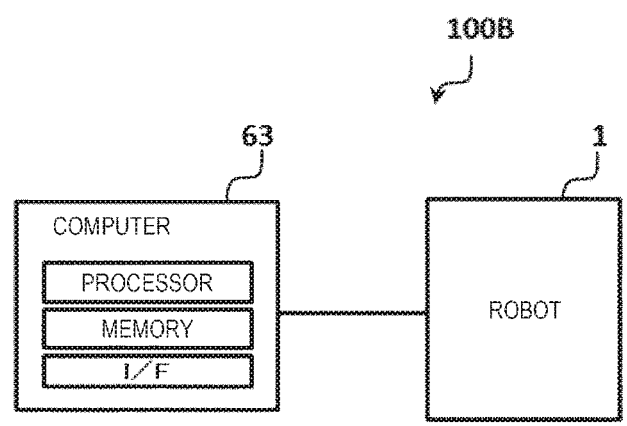
FIG. 22 is a block diagram illustrating another example of the robot system.
Figure 23:
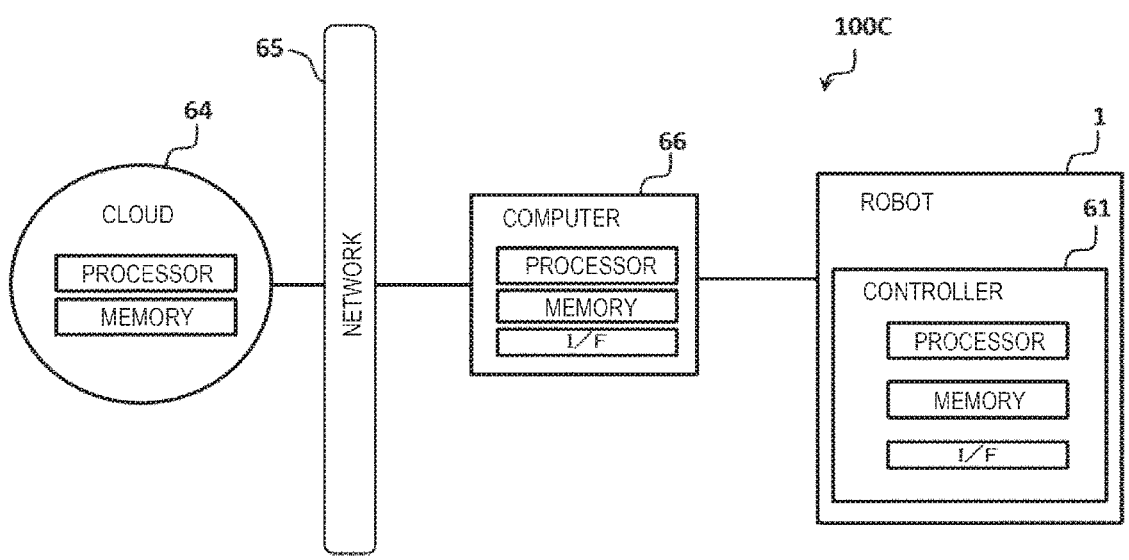
FIG. 23 is a block diagram illustrating another example of the robot system.

The robot system according to the third invention may be in the forms illustrated in FIGS. 22 and 23.

FIGS. 22 and 23 are block diagrams illustrating other examples of the robot system.

FIG. 22 illustrates the entire configuration diagram of a robot system 100B in which a computer 63 is directly connected to the robot 1. Control of the robot 1 is executed directly by reading a command in a memory by a processor existing in the computer 63. The computer 63 has the function of the control device 5 described above. The computer 63 may be built in the robot 1.

FIG. 23 illustrates the entire configuration diagram of a robot system 100C in which the robot 1 with the controller 61 built therein and a computer 66 are connected and the computer 66 is connected to a cloud 64 via a network 65 such as a local area network (LAN). The control device 5 described above can be configured by the controller 61, for example. However, control of the robot 1 may be executed by reading a command in the memory by a processor existing in the computer 66, or executed by reading the command in the memory via the computer 66 by a processor existing on the cloud 64. Accordingly, the control device 5 may be assumed as being configured by the controller 61 and the computer 66, or may be assumed as being configured by the controller 61, the computer 66, and the cloud 64.

Although the control device and the robot system according to the invention have been described based on the illustrated embodiments, the invention is not limited thereto, and the configuration of each unit can be replaced with any configuration having the same function. Any other constituent elements may be added to the invention. Further, respective embodiments may be appropriately combined.

In the embodiments described above, although a so-called six-axis vertical articulated robot is exemplified as the robot included in the robot system according to the invention, the robot may be another robot such as a SCARA robot, for example. The robot is not limited to a single-arm robot, but may be another robot such as a dual-arm robot, for example. Accordingly, the number of movable units is not limited to one, and may be two or more. Although the number of arms of the robot arm included in the movable unit is six in the embodiments described above, it may be 1 to 5, or 7 or more.

The entire disclosure of Japanese Patent Application No. 2017-166490, filed Aug. 31, 2017 is expressly incorporated by reference herein.

What is claimed is:

1. A control device comprising:
 a processor that is configured to execute computer-executable instructions so as to control a robot,
 wherein the processor is configured to:
 receive information on a captured image from an imaging device capturing an image from an operator,
 control driving of a robot including a robot arm on which a stamp that forms a marker on a marker forming object and an end effector that performs work on a work target are allowed to be provided by being replaced by each other,
 perform correlation between a robot coordinate system that is a coordinate system relating to the robot and an image coordinate system that is a coordinate system relating to the captured image, and
perform the correlation based on a plurality of coordinates of a predetermined portion of the robot arm in the robot coordinate system and a plurality of coordinates of the plurality of markers in the image coordinate system when the plurality of markers are formed on the marker forming object by the stamp, in a case where the end effector is not provided on the robot arm.

2. A control device comprising:
a processor that is configured to execute computer-executable instructions so as to control a robot,
wherein the processor is configured to:
receive information on a captured image from an imaging device capable of capturing an image from an operator,
perform work on a work target and control driving of a robot that includes a robot arm on which a stamp that forms a marker together with a marker forming object is provided,
perform correlation between a robot coordinate system that is a coordinate system relating to the robot and an image coordinate system that is a coordinate system relating to the captured image, and
perform the correlation based on a plurality of coordinates of a predetermined portion of the robot arm in the robot coordinate system and a plurality of coordinates of the plurality of markers in the image coordinate system when the plurality of markers are formed on the marker forming object by the stamp and the marker forming object.

3. The control device according to claim 1,
wherein the processor is configured to form the marker by bringing the stamp into contact with the marker forming object.

4. The control device according to claim 2,
wherein the processor is configured to form the marker by bringing the stamp into contact with the marker forming object.

5. The control device according to claim 1,
wherein the processor is configured to control driving of the robot so as to form the marker by bringing the stamp.

6. The control device according to claim 2,
wherein the processor is configured to control driving of the robot so as to form the marker by bringing the stamp into contact with the marker forming object configured by pressure sensitive paper.

7. The control device according to claim 1,
wherein the processor is configured to receive an output from a force detection device provided in the robot arm, and detect contact between the marker forming object and the stamp based on the output from the force detection device.

8. The control device according to claim 2,
wherein the processor is configured to receive an output from a force detection device provided in the robot arm, and detect contact between the marker forming object and the stamp based on the output from the force detection device.

9. The control device according to claim 1,
wherein the processor is configured to obtain a relative relationship between the robot coordinate system and the image coordinate system based on a plurality of coordinates in the robot coordinate system and a plurality of coordinates of the plurality of markers in the image coordinate system when the plurality of markers are formed and then, perform the correlation based on the relative relationship.

10. The control device according to claim 2,
wherein the processor is configured to obtain a relative relationship between the robot coordinate system and the image coordinate system based on a plurality of coordinates in the robot coordinate system and a plurality of coordinates of the plurality of markers in the image coordinate system when the plurality of markers are formed and then, perform the correlation based on the relative relationship.

11. The control device according to claim 9,
wherein the processor is configured to perform the correlation using coordinates in the robot coordinate system of which the number is larger than the number of the coordinates in the robot coordinate system used when obtaining the relative relationship and coordinates in the image coordinate system of which the number is larger than the number of the coordinates in the image coordinate system used when obtaining the relative relationship.

12. The control device according to claim 10,
wherein the processor is configured to perform the correlation using coordinates in the robot coordinate system of which the number is larger than the number of the coordinates in the robot coordinate system used when obtaining the relative relationship and coordinates in the image coordinate system of which the number is larger than the number of the coordinates in the image coordinate system used when obtaining the relative relationship.

13. The control device according to claim 1,
wherein the processor is configured to control driving of the robot so as to form the marker by the stamp provided at a tip end portion of the robot arm.

14. The control device according to claim 2,
wherein the processor is configured to control driving of the robot so as to form the marker by the stamp provided at a tip end portion of the robot arm.

15. A robot system comprising:
a robot; and
a control device that comprises a processor that is configured to execute computer-executable instructions so as to control the robot;
wherein the processor is configured to:
receive information on a captured image from an imaging device capturing an image from an operator,
control driving of a robot including a robot arm on which a stamp that forms a marker on a marker forming object and an end effector that performs work on a work target are allowed to be provided by being replaced by each other,
perform correlation between a robot coordinate system that is a coordinate system relating to the robot and an image coordinate system that is a coordinate system relating to the captured image, and
perform the correlation based on a plurality of coordinates of a predetermined portion of the robot arm in the robot coordinate system and a plurality of coordinates of the plurality of markers in the image coordinate system when the plurality of markers are formed on the marker forming object by the stamp, in a case where the end effector is not provided on the robot arm.

16. A robot system comprising:
a robot; and
a control device that comprises a processor that is configured to execute computer-executable instructions so as to control the robot;
wherein the processor is configured to:
receive information on a captured image from an imaging device capable of capturing an image from an operator,
perform work on a work target and control driving of a robot that includes a robot arm on which a stamp that forms a marker together with a marker forming object is provided,
perform correlation between a robot coordinate system that is a coordinate system relating to the robot and an image coordinate system that is a coordinate system relating to the captured image, and
perform the correlation based on a plurality of coordinates of a predetermined portion of the robot arm in the robot coordinate system and a plurality of coordinates of the plurality of markers in the image coordinate system when the plurality of markers are formed on the marker forming object by the stamp and the marker forming object.

17. A robot system according to claim 15,
wherein the processor is configured to form the marker by bringing the stamp into contact with the marker forming object.

18. A robot system according to claim 16,
wherein the processor is configured to form the marker by bringing the stamp into contact with the marker forming object.

* * * * *